US00RE50813E

(19) United States
(12) Reissued Patent
Takahashi et al.

(10) Patent Number: US RE50,813 E
(45) **Date of Reissued Patent: *Mar. 10, 2026**

(54) LIQUID SUPPLYING DEVICE HAVING TANK AND CARTRIDGE ATTACHABLE THERETO

(71) Applicant: BROTHER KOGYO KABUSHIKI KAISHA, Nagoya (JP)

(72) Inventors: Hiroaki Takahashi, Nagoya (JP); Yoshinori Osakabe, Seto (JP); Akinari Ishibe, Okazaki (JP); Tatsuya Shindo, Nagoya (JP); Masahiro Hayashi, Kiyosu (JP)

(73) Assignee: BROTHER KOGYO KABUSHIKI KAISHA, Nagoya (JP)

( * ) Notice: This patent is subject to a terminal disclaimer.

(21) Appl. No.: 18/241,408

(22) Filed: Sep. 1, 2023

Related U.S. Patent Documents

Reissue of:
(64) Patent No.: 11,117,382
Issued: Sep. 14, 2021
Appl. No.: 16/555,472
Filed: Aug. 29, 2019

U.S. Applications:
(63) Continuation of application No. 15/902,755, filed on Feb. 22, 2018, now Pat. No. 11,077,668.

(30) Foreign Application Priority Data

Feb. 28, 2017 (JP) ..... 2017-037642
Aug. 31, 2018 (JP) ..... 2018-163493

(51) Int. Cl.
*B41J 2/175* (2006.01)

(52) U.S. Cl.
CPC ..... *B41J 2/17513* (2013.01); *B41J 2/1752* (2013.01)

(58) Field of Classification Search
CPC ..... B41J 2/17523
See application file for complete search history.

(56) References Cited

U.S. PATENT DOCUMENTS 6,022,102 A * 2/2000 Ikkatai ..... B41J 2/1652 347/85
6,332,675 B1 * 12/2001 Koitabashi ..... B41J 2/17533 347/86

(Continued)

FOREIGN PATENT DOCUMENTS

CN 2637169 Y 9/2004
CN 201376392 Y 1/2010

(Continued)

OTHER PUBLICATIONS

Notice of Allowance issued in related U.S. Appl. No. 18/459,649, Mar. 27, 2024.

(Continued)

*Primary Examiner* — Deandra M Hughes
(74) *Attorney, Agent, or Firm* — Merchant & Gould P.C.

(57) ABSTRACT

A liquid supplying device includes a tank and a cartridge. The cartridge is configured to be detachably attached to the tank in an attachment-detachment direction crossing a vertical direction. The cartridge includes a first storage chamber. The tank includes a second storage chamber, a liquid passage, and a gas passage. The liquid passage has a first end, a second end, and a first extending portion. The second end is formed with a second opening open to an atmosphere. The first extending portion extends from the second opening in the attachment-detachment direction. The gas passage has a third end, a fourth end, and a second extending portion. The fourth end is formed with a fourth opening open to the atmosphere. The second extending portion extends from the fourth opening in the attachment-detachment direction. The (Continued)

second opening is at a position different from the fourth opening in the attachment-detachment direction.

35 Claims, 13 Drawing Sheets

(56) References Cited

U.S. PATENT DOCUMENTS

| | | | | |
|---|---|---|---|---|
| 6,505,923 | B1 * | 1/2003 | Yamamoto | B41J 2/17553 347/85 |
| 6,520,630 | B1 | 2/2003 | Oda et al. | |
| 6,866,355 | B2 | 3/2005 | Aruga et al. | |
| 10,322,586 | B2 * | 6/2019 | Hayashi | B41J 2/17533 |
| 10,332,586 | B1 * | 6/2019 | Hush | G11C 8/12 |
| 10,350,897 | B2 * | 7/2019 | Hayashi | B41J 2/17513 |
| 10,618,295 | B2 * | 4/2020 | Hayashi | B41J 2/17513 |
| 10,792,295 | B2 * | 10/2020 | Majeed | A61P 31/04 |
| 10,792,926 | B2 * | 10/2020 | Hayashi | B41J 29/02 |
| 11,072,182 | B2 * | 7/2021 | Hayashi | B41J 2/1752 |
| 11,077,668 | B2 * | 8/2021 | Hayashi | B41J 2/1752 |
| 11,117,382 | B2 | 9/2021 | Takahashi et al. | |
| 11,597,208 | B2 * | 3/2023 | Hayashi | B41J 2/1752 |
| 11,745,513 | B2 * | 9/2023 | Hayashi | B41J 2/17509 347/86 |
| 11,787,192 | B2 | 10/2023 | Takahashi et al. | |
| 12,234,988 | B1 * | 2/2025 | Dai | F23R 3/36 |
| 2001/0020971 | A1 | 9/2001 | Usui et al. | |
| 2002/0167571 | A1 * | 11/2002 | Hayashi | B41J 2/17503 347/85 |
| 2006/0164478 | A1 | 7/2006 | Fukazawa | |
| 2006/0170742 | A1 | 8/2006 | Inoue et al. | |
| 2006/0238583 | A1 * | 10/2006 | Petersen | B41J 2/17536 347/86 |
| 2009/0201351 | A1 | 8/2009 | Shimizu et al. | |
| 2013/0327852 | A1 * | 12/2013 | Hara | B41J 2/17523 239/553 |
| 2015/0258797 | A1 * | 9/2015 | Miyashita | B41J 2/17509 347/85 |
| 2016/0067978 | A1 * | 3/2016 | Okuno | B41J 2/17553 347/85 |
| 2016/0207324 | A1 | 7/2016 | Gonzales et al. | |
| 2016/0297205 | A1 | 10/2016 | Takahashi | |
| 2017/0072700 | A1 * | 3/2017 | Ishizawa | B41J 2/17553 |
| 2018/0244057 | A1 * | 8/2018 | Hayashi | B41J 2/17513 |
| 2021/0379900 | A1 * | 12/2021 | Leiser | B41J 2/17523 |

FOREIGN PATENT DOCUMENTS

| | | | |
|---|---|---|---|
| CN | 201516728 | U | 1/2010 |
| CN | 204054953 | U | 12/2014 |
| EP | 0 803 364 | A2 | 10/1997 |
| EP | 1 772 269 | A2 | 4/2007 |
| EP | 3 098 078 | A1 | 11/2016 |
| JP | 5-330029 | A | 12/1993 |
| JP | 9-58003 | A | 3/1997 |
| JP | 2001-1539 | A | 1/2001 |
| JP | 2001-187459 | A | 7/2001 |
| JP | 2001-270095 | A | 10/2001 |
| JP | 2006-205528 | A | 8/2006 |
| JP | 2007-313829 | A | 12/2007 |
| JP | 2009-179045 | A | 8/2009 |
| JP | 2010-137510 | A | 6/2010 |
| JP | 4934338 | B2 | 5/2012 |
| JP | 2014-184566 | A | 10/2014 |
| JP | 2016-159620 | A | 9/2016 |
| WO | 2015-016119 | A | 3/2017 |

OTHER PUBLICATIONS

Corrected Notice of Allowance issued in related U.S. Appl. No. 18/459,649, Apr. 5, 2024.
Extended European Search Report issued in related European Patent Application No. 18158437.6, mailed Aug. 17, 2018.
Office Action (Notice of Reasons for Refusal) issued in corresponding Japanese Patent Application No. 2017-037642, Dec. 22, 2020.
Office Action issued in related U.S. Appl. No. 17/410,107, Jan. 26, 2023.
Office Action issued in related U.S. Appl. No. 17/391,402, Dec. 20, 2022.
Office Action issued in related U.S. Appl. No. 17/391,402, Aug. 5, 2022.
Office Action issued in related U.S. Appl. No. 15/902,755, Dec. 7, 2020.
Office Action issued in related U.S. Appl. No. 15/902,755, Nov. 19, 2019.
Office Action issued in related U.S. Appl. No. 15/902,755, Apr. 6, 2020.
Notice of Allowance issued in related U.S. Appl. No. 17/391,402, Apr. 19, 2023.
Notice of Allowance issued in related U.S. Appl. No. 16/555,472, May 20, 2021.
Notice of Allowance issued in related U.S. Appl. No. 17/410,107, Jun. 7, 2023.
Notice of Allowance issued in related U.S. Appl. No. 15/902,755, Apr. 1, 2021.
Office Action issued in the corresponding Chinese Patent Application No. 201810156748.9, Mar. 1, 2022.
Office Action issued in corresponding Japanese Patent Application No. 2018-163493, Jun. 14, 2022.
Office Action issued in the corresponding Chinese Patent Application No. 201810156748.9, Aug. 27, 2021.
Extended European Search Report issued in related European Patent Application No. 18158437.6, dated Aug. 17, 2018.
Office Action (Notice of Reasons for Refusal) issued in corresponding Japanese Patent Application No. 2017-037642, dated Dec. 22, 2020.

* cited by examiner

LIQUID SUPPLYING DEVICE HAVING TANK AND CARTRIDGE ATTACHABLE THERETO

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application is a reissue of U.S. Pat. No. 11,117,382, which claims priority as a continuation-in-part application from U.S. patent application Ser. No. 15/902,755, filed on Feb. 22, 2018, *now U.S. Pat. No. 11,077,668,* which claims priority from Japanese Patent Application No. 2017-037642, filed on Feb. 28, 2017. The present application further claims priority from Japanese Patent Application No. 2018-163493, filed on Aug. 31, 2018. The disclosures of each of these applications are hereby incorporated by reference in their entireties.

TECHNICAL FIELD

The present disclosure relates to a liquid supplying device having a tank capable of storing liquid therein and a cartridge attachable to the tank, and an image forming apparatus including the liquid supplying device.

BACKGROUND

Conventionally, there has been known a liquid supplying device provided with a cartridge in which ink is stored, a sub tank connected to a recording head, and a liquid flow passage and a gas flow passage which connects the cartridge and the sub tank. The cartridge is disposed vertically above the sub tank. The liquid flow passage and the gas flow passage connect the cartridge and the sub tank in the vertical direction. The liquid flow passage and the gas flow passage are opened to the lower surface of the cartridge and the upper surface of the sub tank, respectively. Such a liquid supply device is disclosed in Japanese Patent No. 4934338, for example.

SUMMARY

In the sub tank, the liquid flow passage extends below the gas flow passage, and the opening position of the gas flow passage is higher than the opening position of the liquid flow passage. When the cartridge is connected in a state in which there is no ink in the sub tank, such as when replacing the cartridge, the ink in the cartridge naturally drops via the liquid flow passage and is introduced into the sub tank. At this time, the air in the sub tank having the same volume as the amount of introduced ink is introduced into the cartridge via the gas flow passage. Such a gas-liquid substitution is performed until the opening of the gas flow passage is blocked by ink, and the ink is stored in the sub tank.

When ink is ejected from the recording head at the time of executing the recording operation, the amount of ink in the sub tank decreases and the liquid level of the ink in the sub tank decreases. As a result, since the opening of the gas flow passage is opened, ink is supplied from the cartridge into the sub tank via the liquid flow passage. When the level of ink in the sub tank rises due to the introduction of the ink and the opening of the gas flow passage is blocked, the supply of ink from the cartridge is stopped. Ink is replenished from the cartridge to the sub tank so as to compensate for consumption of ink in the recording head, and the height of the liquid level of the ink in the sub tank is kept at the opening position of the gas flow passage. Therefore, by exchanging the cartridge in which the ink is empty with the cartridge filled with ink while the sub tank is disposed in a printer, the printer can be continuously used.

In the liquid supplying device, the cartridge is connected to the sub tank in the vertical direction. When the cartridge is replaced, the cartridge needs to be attached and detached in the vertical direction. Since the cartridge cannot be replaced from the front of the printer, it is inconvenient and operability in exchange of the cartridge is poor. On the other hand, in a conceivable configuration in which the cartridge is attached to and detached from the sub tank in a direction perpendicular to the vertical direction, gas (bubbles) flown from the sub tank into the cartridge may stay or float near the opening of the liquid flow passage. This may possibly cause the gas to return to the sub tank through the opening of the liquid flow passage.

The disclosure has been made in view of the above problems, and an object thereof is to provide a liquid supplying device which has good operability in replacing a cartridge and which is capable of suppressing possibility that gas (bubbles) flown into a cartridge will return to a tank.

According to one aspect, the disclosure provides a liquid supplying device including a tank and a cartridge. The cartridge is configured to be attached to and detached from the tank in an attachment-detachment direction crossing a vertical direction. The cartridge includes a first storage chamber configured to store liquid. The tank includes a second storage chamber, a liquid passage, a gas passage, and an air communication portion. The second storage chamber is configured to store the liquid. The liquid passage is in communication with the second storage chamber. The liquid passage has a first end, a second end, and a first extending portion. The first end is connected to the second storage chamber and formed with a first opening. The second end is opposite to the first end and formed with a second opening open to an atmosphere. The first extending portion extends from the second opening in the attachment-detachment direction. The gas passage is in communication with the second storage chamber. The gas passage has a third end, a fourth end, and a second extending portion. The third end is connected to the second storage chamber and formed with a third opening. The fourth end is opposite to the third end and formed with a fourth opening open to the atmosphere. The second extending portion extends from the fourth opening in the attachment-detachment direction. The air communication portion has an air communication opening allowing the second storage chamber to communicate with the atmosphere. The second opening is at a position different from the fourth opening in the attachment-detachment direction. In an attachment state where the first storage chamber is in communication with both the second opening and the fourth opening, the first storage chamber has a portion positioned above the liquid passage and the gas passage.

According to another aspect, the disclosure provides an image recording apparatus including a liquid supplying device. The liquid supplying device includes a tank and a cartridge. The cartridge is configured to be attached and detached from the tank in an attachment-detachment direction crossing a vertical direction. The cartridge includes a first storage chamber configured to store liquid. The tank includes a second storage chamber, a liquid passage, a gas passage, and an air communication portion. The second storage chamber is configured to store the liquid. The liquid passage is in communication with the second storage chamber. The liquid passage has a first end, a second end, and a first extending portion. The first end is connected to the second storage chamber and formed with a first opening. The second end is opposite to the first end and formed with a second opening open to an atmosphere. The first extending portion extends from the second opening in the attachment-detachment direction. The gas passage is in communication with the second storage chamber. The gas passage has a third end, a fourth end, and a second extending portion. The third end is connected to the second storage chamber and formed with a third opening. The fourth end is opposite to the third end and formed with a fourth opening open to the atmosphere. The second extending portion extends from the fourth opening in the attachment-detachment direction. The air communication portion has an air communication opening allowing the second storage chamber to communicate with the atmosphere. The second opening is positioned different from the fourth opening in the attachment-detachment direction. In an attachment state where the first storage chamber is in communication with both the second opening and the fourth opening, the first storage chamber has a portion positioned above the liquid passage and the gas passage.

According to still another aspect, the disclosure provides a liquid supplying device includes a tank, to which a cartridge is detachably attached in an attachment-detachment direction crossing a vertical direction. The cartridge includes a first storage chamber configured to store liquid. The tank includes a second storage chamber, a liquid passage, a gas passage, and an air communication portion. The second storage chamber is configured to store the liquid. The liquid passage is in communication with the second storage chamber. The liquid passage has a first end, a second end, and a first extending portion. The first end is connected to the second storage chamber and formed with a first opening. The second end is opposite to the first end and formed with a second opening open to an atmosphere. The first extending portion extends from the second opening in the attachment-detachment direction. The gas passage is in communication with the second storage chamber. The gas passage has a third end, a fourth end, and a second extending portion. The third end is connected to the second storage chamber and formed with a third opening. The fourth end is opposite to the third end and formed with a fourth opening open to the atmosphere. The second extending portion extends from the fourth opening in the attachment-detachment direction. The air communication portion has an air communication opening allowing the second storage chamber to communicate with the atmosphere. The second opening is at a position different from the fourth opening in the attachment-detachment direction. In an attachment state where both the second opening and the fourth opening are communication with the first storage chamber of the cartridge, the liquid passage and the gas passage are positioned below a portion of the first storage chamber.

BRIEF DESCRIPTION OF THE DRAWINGS

The particular features and advantages of the disclosure will become apparent from the following description taken in connection with the accompanying drawings, in which.

DETAILED DESCRIPTION

Figure 1A:
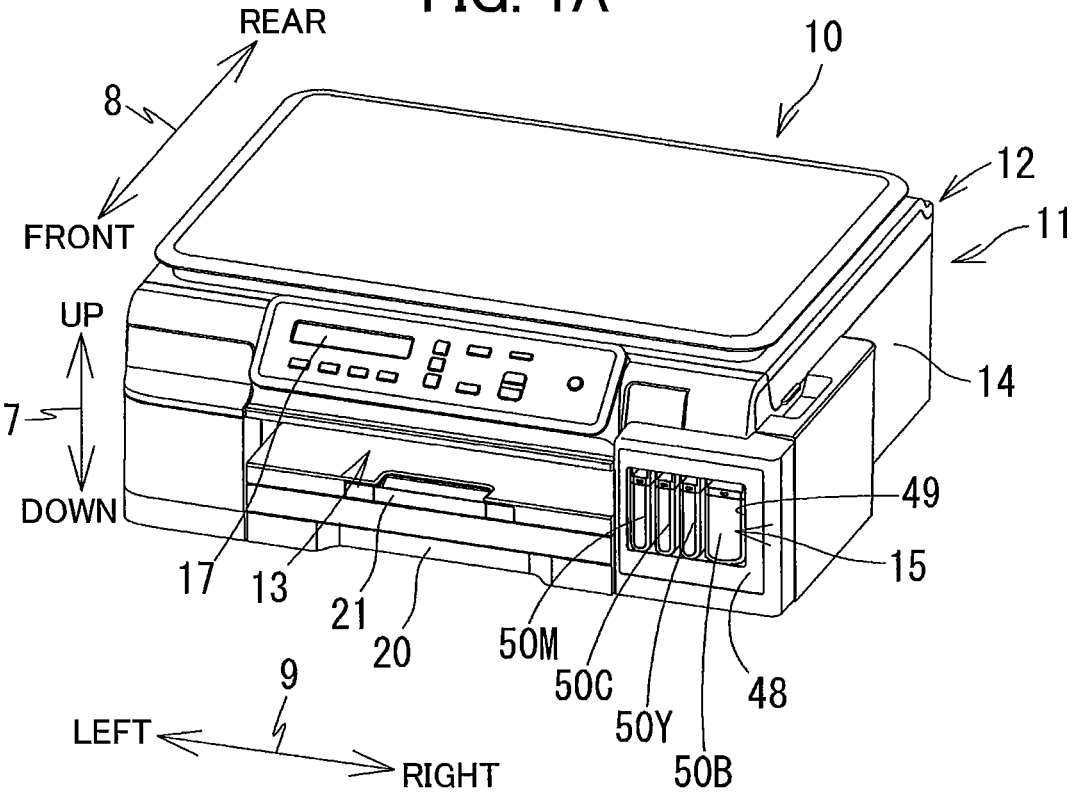
FIG. 1A is a perspective view of a multifunction machine according to an embodiment in a state where a cover is at a close position.

Hereinafter, embodiments of the disclosure will be described. It is noted that the embodiments described below are merely examples of the disclosure and the embodiments of the disclosure can be appropriately modified without changing the scope of the disclosure. Further, on the basis of the posture (the posture of FIG. 1, and referred to as "use posture" occasionally) in which a multifunction machine 10 and an ink cartridge 50 attached to the multifunction machine 10 are installed on a horizontal plane so as to be usable, an up-down direction 7 (an example of a cross direction) is defined, and a front-rear direction 8 is defined by a surface provided with an opening 13 of the multifunction machine 10 as the front surface, and a left-right direction 9 is defined when the multifunction machine 10 is viewed from the front side. In this embodiment, at the use posture, the up-down direction 7 corresponds to the vertical direction, and the front-rear direction 8 and the left-right direction 9 correspond to the horizontal direction.

Embodiment

Hereinafter, the multifunction machine 10 (an example of an image recording device) and the ink supplying device 15 (an example of a liquid supplying device) according to this embodiment will be described.

Whole Configuration of Multifunction Machine 10

Figure 1B:
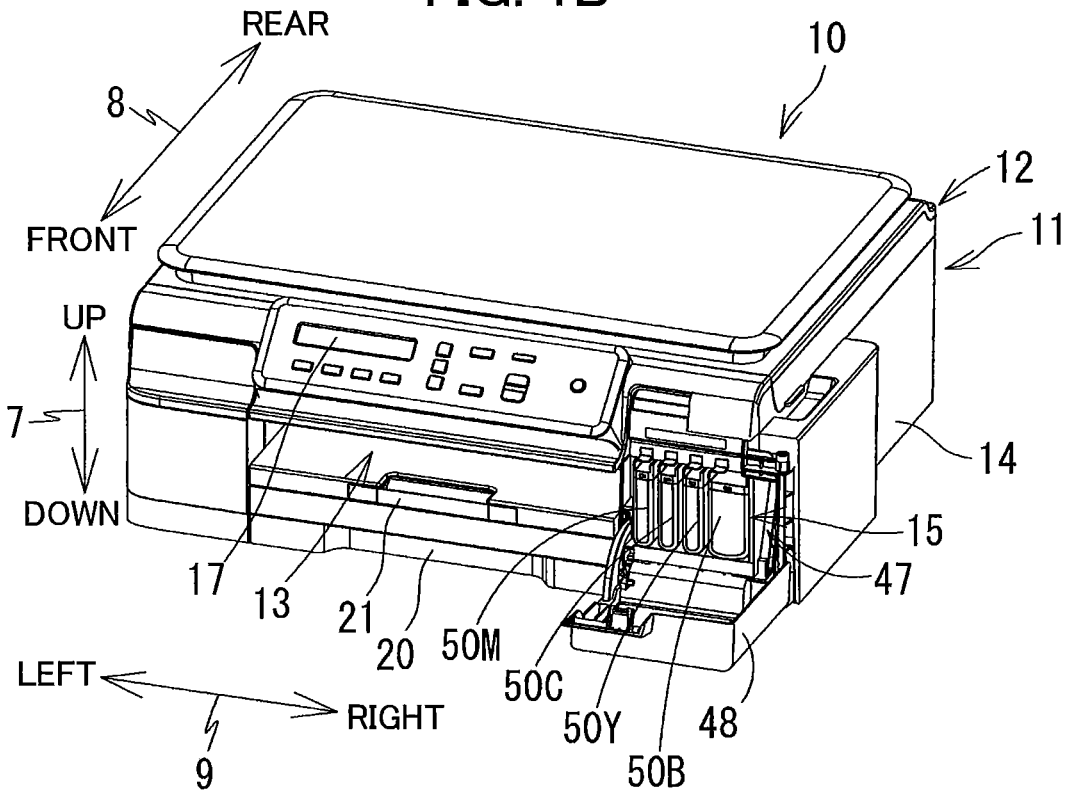
FIG. 1B is a perspective view of the multifunction machine according to the embodiment in a state where the cover is at an open position.

As illustrated in FIGS. 1A and 1B, the multifunction machine 10 has a substantially rectangular parallelepiped shape. The multifunction machine 10 has a printer unit 11, a scanner unit 12, and an operation panel 17. The printer unit 11 is located in a lower part of the multifunction machine 10, and records an image on a sheet 28 (see FIG. 2) in an ink jet recording method. The scanner unit 12 is a device having a scan function and is located in an upper part of the printer unit 11. The printer unit 11 is provided with a casing 14 having an opening 13 that is opened forward, and an ink supplying device 15 located on a right side of the opening 13 inside the casing 14. The operation panel 17 is located in a front part of the scanner unit 12. The operation panel 17 is operated by a user so as to cause the multifunction machine 10 to execute image recording by the printer unit 11 or image reading by the scanner unit 12.

Figure 2:
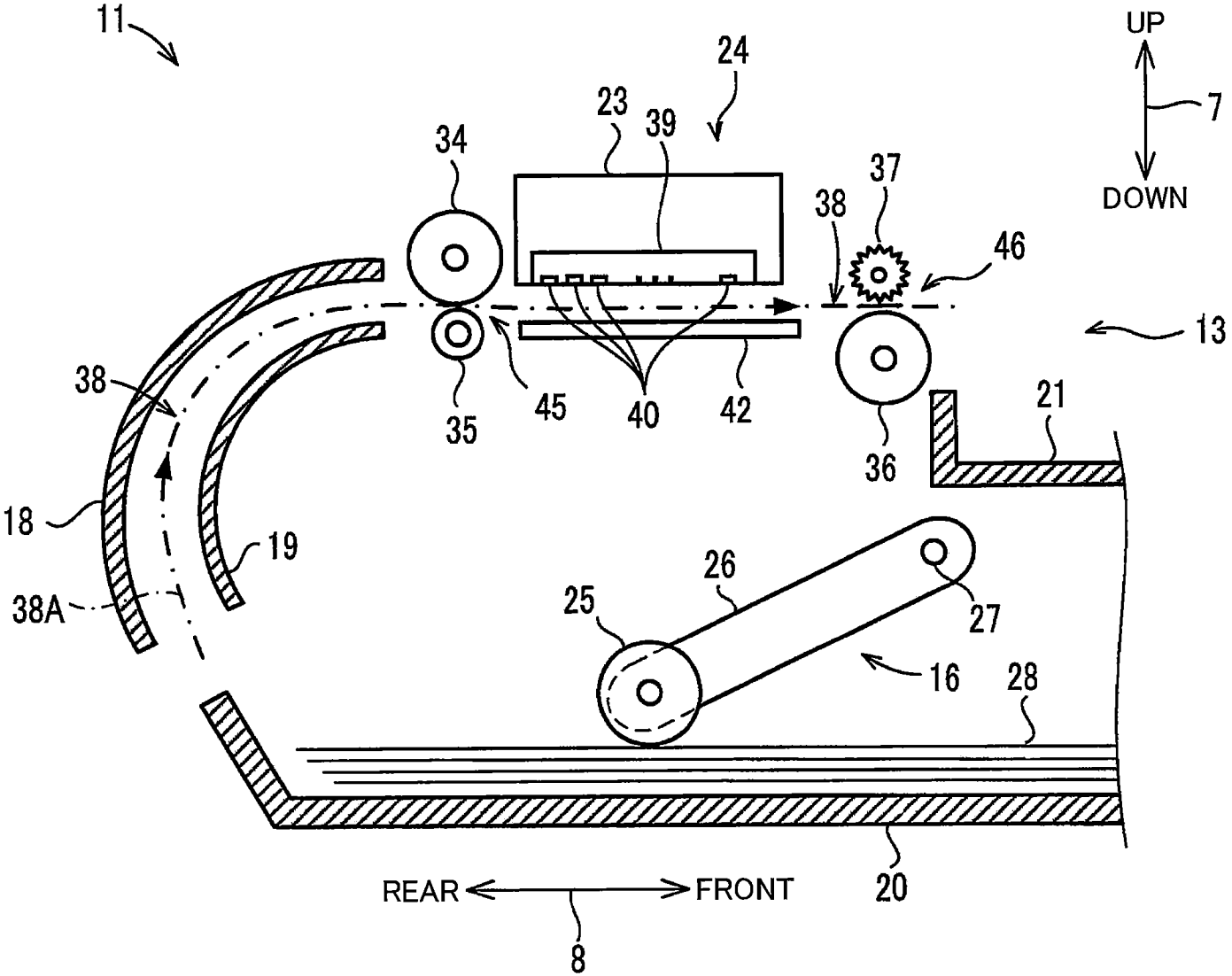
FIG. 2 is a vertical sectional view of a printer according to the embodiment indicating an internal structure of the printer.

As illustrated in FIG. 2, a feeding unit 16, a feeding tray 20, a discharge tray 21, a pair of conveying rollers 45, a recording unit 24, a pair of discharge rollers 46, and a platen 42 are disposed inside the casing 14.

Feeding Tray 20, Discharge Tray 21

As illustrated in FIG. 1, the feeding tray 20 can be inserted into and removed from the casing 14 through the opening 13 along the front-rear direction 8. The opening 13 is located on the front surface of the multifunction machine 10 and at the central portion in the left-right direction 9. As illustrated in FIG. 2, the feeding tray 20 can support a plurality of stacked sheets 28. The discharge tray 21 is disposed in the upper part of the feeding tray 20 and is inserted and extracted along the front-rear direction 8 together with the feeding tray 20. The discharge tray 21 supports the sheet 28 discharged by the pair of discharge rollers 46.

Feeding Unit 16

The feeding unit 16 feeds the sheet 28 supported by the feeding tray 20 to a conveying path 38. As illustrated in FIG. 2, the feeding unit 16 is provided with a feeding roller 25, a feeding arm 26, and a shaft 27. The feeding roller 25 is rotatably supported at the distal end of the feeding arm 26. Driving is transmitted to the feeding roller 25 from a feeding motor (not illustrated). The feeding arm 26 is rotatably supported by the shaft 27 that is supported by a frame of the printer unit 11. The feeding arm 26 is pivotally urged toward the feeding tray 20 by its own weight or an elastic force of a spring.

Hereinafter, the rotation of the feeding roller 25, the conveying roller 34, and the discharge roller 36 related to the conveyance of the sheet 28 in a conveying direction 38A for conveying the sheet 28 is indicated as "normal rotation". The rotation of the feeding roller 25, the conveying roller 34, and the discharge roller 36 opposite rotation to the normal rotation is indicated as "reverse rotation".

Conveying Path 38

Figure 3:
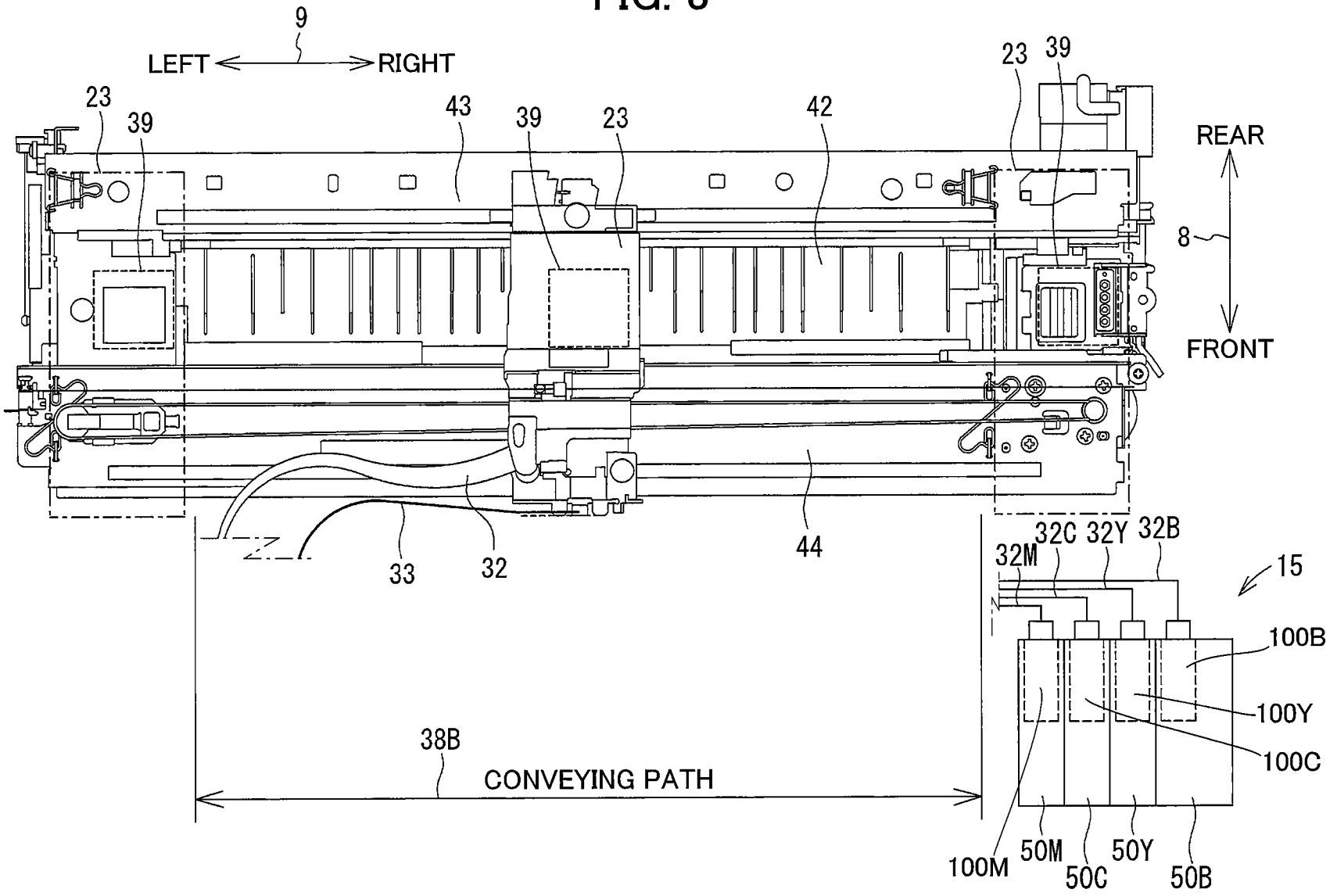
FIG. 3 is a planner view indicating disposition of a carriage and an ink supplying device according to the embodiment.

As illustrated in FIG. 2, the conveying path 38 indicates a space which is partially formed by an outer guide member 18 and an inner guide member 19 facing each other at a predetermined interval inside the printer unit 11. The conveying path 38 is a path extending rearward from the rear end portion of the feeding tray 20. The conveying path 38 is bent forward as making U-turn, while extending upward at the rear portion of the printer unit 11, and reaches the discharge tray 21 via the space between the recording unit 24 and the platen 42. As illustrated in FIGS. 2 and 3, the conveying path 38 between the pair of conveying rollers 45 and the pair of discharge rollers 46 is provided at the substantially center of the multifunction machine 10 in the left-right direction 9, and extends in the front-rear direction 8. The conveying direction 38A of the sheet 28 in the conveying path 38 is indicated by the arrow in FIG. 2.

Pair of Conveying Rollers 45

As illustrated in FIG. 2, the pair of conveying rollers 45 is located upstream of the recording unit 24 in the conveying direction 38A. The pair of conveying rollers 45 has a conveying roller 34 and a pinch roller 35 that face each other. The driving is transmitted to the conveying roller 34 from a conveying motor (not illustrated), and the conveying roller 34 rotates in the normal rotation or the reverse rotation. The pinch roller 35 rotates with the rotation of the conveying roller 34. The sheet 28 is conveyed in the conveying direction 38A, while being nipped between the conveying roller 34 and the pinch roller 35 rotating in the normal direction.

Pair of Discharge Rollers 46

As illustrated in FIG. 2, the pair of discharge rollers 46 is disposed downstream of the recording unit 24 in the conveying direction 38A. The pair of discharge rollers 46 has a discharge roller 36 and a spur 37 facing each other. The driving force generated by a conveying motor (not illustrated) is transmitted to the discharge roller 36 to rotate in the normal rotation or the reverse rotation. The spur 37 rotates with the rotation of the discharge roller 36. The sheet 28 is conveyed in the conveying direction 38A, while being nipped between the discharge roller 36 and the spur 37 rotating in the normal rotation.

Recording Unit 24

As illustrated in FIG. 2, the recording unit 24 is located between the pair of conveying rollers 45 and the pair of discharge rollers 46 in the conveying direction 38A. The recording unit 24 faces the platen 42 in the up-down direction 7 across the conveying path 38. The recording unit 24 is provided with a carriage 23, and a recording head 39 mounted on the carriage 23.

As illustrated in FIG. 3, the carriage 23 is supported by guide rails 43 and 44 each extending in the left-right direction 9. The guide rails 43 and 44 are separated in the front-rear direction 8 and supported by a frame (not illustrated). The carriage 23 is connected to a known belt mechanism provided on the guide rail 44. Driving force generated by a carriage driving motor (not illustrated) is transmitted to the belt mechanism, and the belt mechanism circulates. As the belt mechanism rotates, the carriage 23 reciprocally moves in the left-right direction 9, while being guided by the guide rails 43 and 44. The range of movement of the carriage 23 extends to the right and to the left of the width 38B of the conveying path 38, as indicated by the alternate long and short dashed line of FIG. 3.

The recording head 39 and the four sub tanks 100 (to be described later) provided in the ink supplying device 15 are connected by four ink tubes 32. The recording head 39 is connected to a control board (not illustrated) by a flexible flat cable 33.

The four sub tanks 100 to be described later are a magenta sub tank 100M, a cyan sub tank 100C, a yellow sub tank 100Y, and a black sub tank 100B. The magenta sub tank 100M, the cyan sub tank 100C, the yellow sub tank 100Y, and the black sub tank 100B are collectively referred to as sub tanks 100, unless it is particularly necessary to distinguish in this specification.

The four ink tubes 32 include a yellow ink tube 32Y, a cyan ink tube 32C, a magenta ink tube 32M, and a black ink tube 32B. The yellow ink tube 32Y, the cyan ink tube 32C, the magenta ink tube 32M, and the black ink tube 32B are collectively referred to as ink tubes 32 unless it is particularly necessary to distinguish in this specification. The four ink tubes 32 are bundled together.

The flexible flat cable 33 electrically connects the control board, on which the control unit is mounted, and the recording head 39. The flexible flat cable 33 transmits a control signal, which is output from the control unit, to the recording head 39.

As illustrated in FIG. 2, a plurality of nozzles 40 is disposed on the lower surface of the recording head 39. The distal ends of the plurality of nozzles 40 are exposed from the lower surface of the recording head 39. The recording head 39 ejects ink from the nozzle 40 as minute ink droplets. In the course of movement of the carriage 23, the recording head 39 ejects the ink droplets toward the sheet 28 supported by the platen 42. As a result, an image is recorded on the sheet 28. Further, the ink stored in the four sub tanks 100 is consumed.

Platen 42

As illustrated in FIGS. 2 and 3, the platen 42 is disposed between the pair of conveying rollers 45 and the pair of discharge rollers 46 in the conveying path 38. The platen 42 is disposed to face the recording unit 24 in the up-down direction 7 across the conveying path 38. The platen 42 supports the sheet 28 conveyed by the pair of conveying rollers 45 from below.

Cover 48

As illustrated in FIG. 1B, an opening 47 is formed in the right front part of the casing 14. An ink supplying device 15 is housed in the casing 14, and the front surface of the ink supplying device 15 is exposed from the opening 47. A cover 48 capable of opening and closing the opening 47 is attached to the casing 14. The lower end portion of the cover 48 is supported by the casing 14 so as to be rotatable about an axis extending in the left-right direction 9 below the opening 47. The cover 48 is rotatable between a close position (a position illustrated in FIG. 1A) for closing the opening 47 and an open position (a position illustrated in FIG. 1B) for opening the opening 47.

As illustrated in FIG. 1A, the cover 48 has a light-transmitting portion 49. The light-transmitting portion 49 has translucency so that the internal structure can be visually recognized from the outside of the cover 48. When the cover 48 is at the close position, the front surface of the ink cartridge 50 attached to the ink supplying device 15 can be visually recognized from the light-transmitting portion 49.

Ink Supplying Device 15

Figure 4:
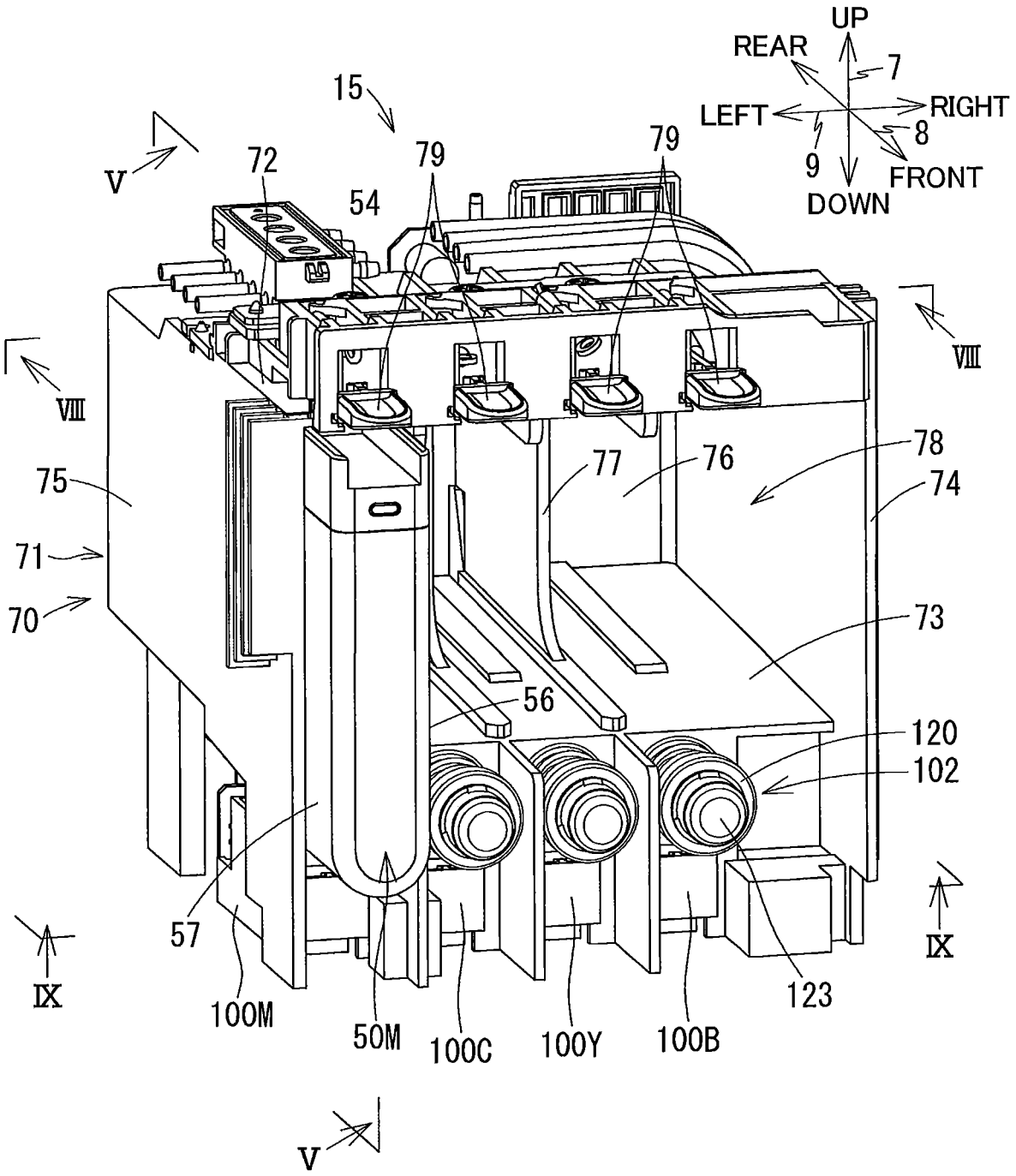
FIG. 4 is a perspective view of the ink supplying device according to the embodiment as viewed from a left front side thereof.

As illustrated in FIGS. 1, 3 and 4, the ink supplying device 15 (an example of a liquid supplying device) is provided with a housing case 71, four sub tanks 100, an atmospheric communication portion 70 (see FIGS. 5 and 11), and a magenta ink cartridge 50M, a cyan ink cartridge 50C, a yellow ink cartridge 50Y, and a black ink cartridge 50B.

Ink Cartridge 50

As illustrated in FIGS. 1 and 3, The magenta ink cartridge 50M, the cyan ink cartridge 50C, the yellow ink cartridge 50Y, and the black ink cartridge 50B are collectively referred to as ink cartridges 50 (an example of cartridges) unless it is particularly necessary to distinguish in this specification.

FIG. 4 illustrates a state in which only the magenta ink cartridge 50M located at the leftmost side in the left-right direction 9 among the four ink cartridges 50 is housed in the housing case 71.

Figure 5:
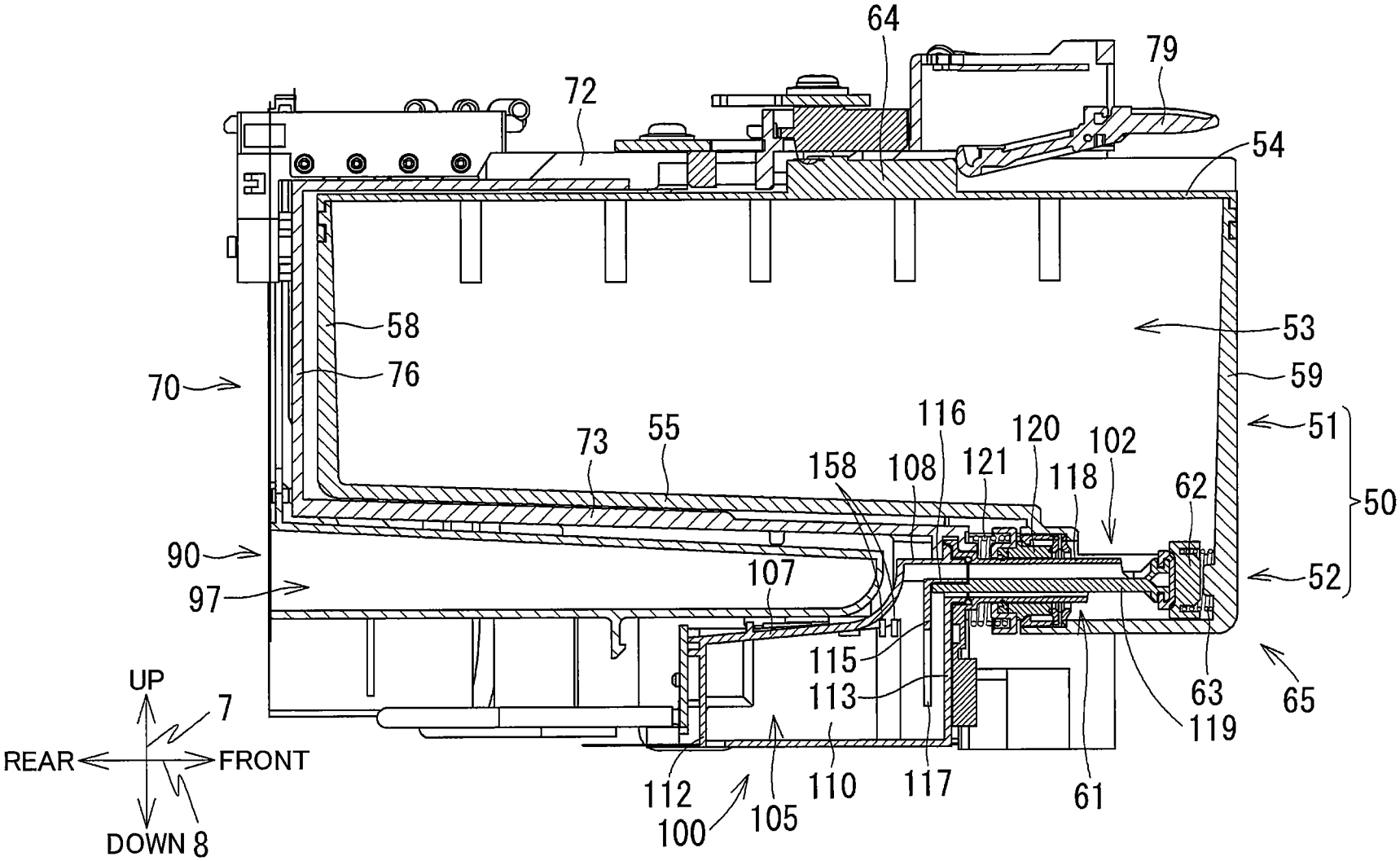
FIG. 5 is a cross-sectional view taken along a line V-V in FIG. 4.
Figure 6:
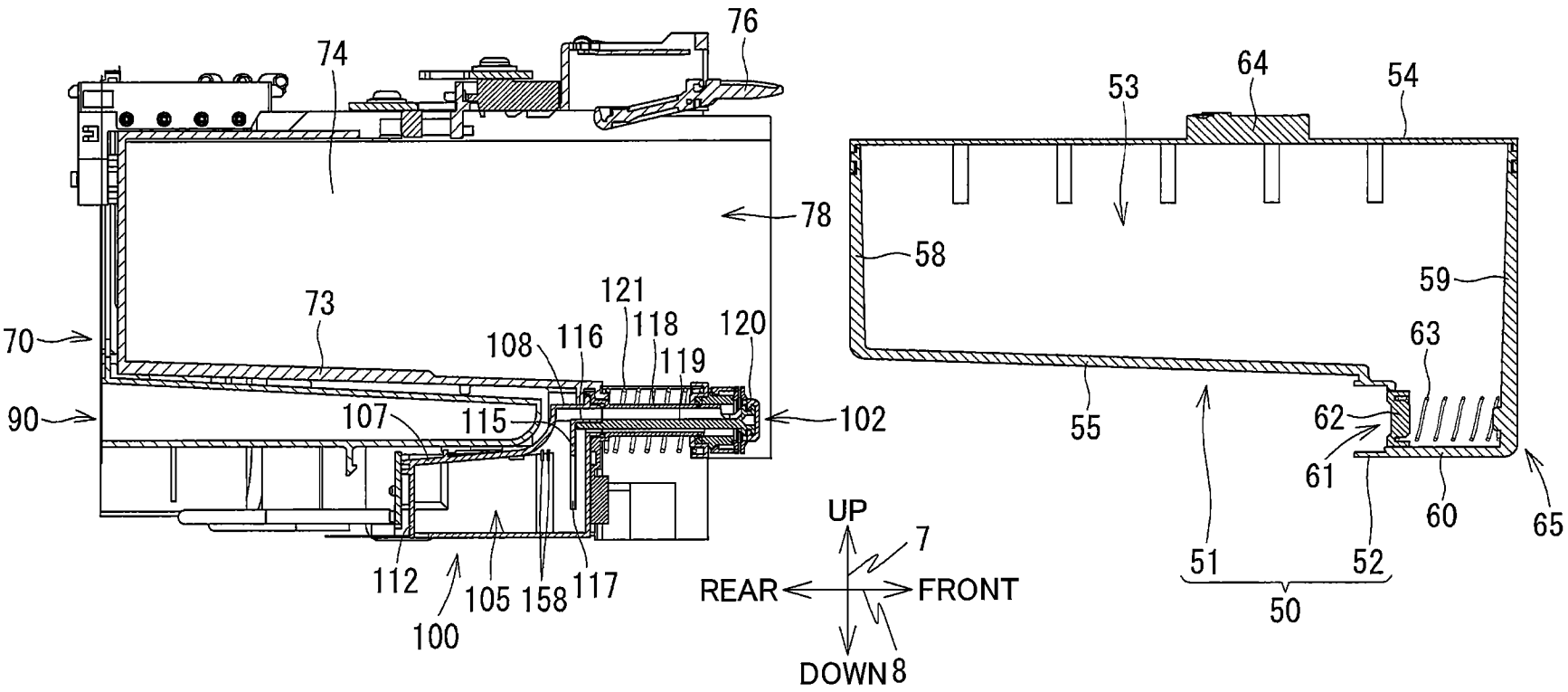
FIG. 6 is a cross-sectional view taken along the line V-V in FIG. 4 in a state where an ink cartridge is detached.

As illustrated in FIGS. 5 and 6, the ink cartridge 50 is provided with a cartridge main body 51 and a joint receiving portion 52. The cartridge main body 51 has a first storage chamber 53 that stores ink (an example of liquid).

The cartridge main body 51 has a substantially rectangular parallelepiped box shape. The cartridge main body 51 has a substantially rectangular shape as viewed from the up-down direction 7 and the front-rear direction 8. The cartridge main body 51 has a protruding portion 65 protruding downward at the front end portion of the cartridge main body 51. The cartridge main body 51 has an upper wall 54, a sub-lower wall 55, a right wall 56 (see FIG. 4), a left wall 57 (see FIG. 4), a rear wall 58, a front wall 59, and a lower wall 60. The lower wall 60 is located at the front part and the lower end part of the cartridge main body 51, and is located below the sub-lower wall 55. The sub-lower wall 55 is located rearward of the lower wall 60. The cartridge main body 51 has a communication port 61 which is opened rearward (an example of the horizontal direction) at the protruding portion 65 and in communication with the first storage chamber. The communication port 61 is an opening which is defined by the sub-lower wall 55, the lower wall 60, the right wall 56, and the left wall 57. The communication port 61 is an example of a communicating opening.

On the upper wall 54, an abutment portion 64 protruding upward is provided at the central portion in the front-rear direction 8. The abutment portion 64 is a portion that abuts against a lock lever 79 (to be described later) of the housing case 71.

The upper surface of the sub-lower wall 55 that defines the bottom surface of the first storage chamber 53 is inclined downward toward the protruding portion 65 in the front-rear direction 8.

The joint receiving portion 52 has a cylindrical shape extending rearward from the portion surrounding the communication port 61 in the cartridge main body 51. The joint receiving portion 52 is a portion into which a joint 102 (to be described later) of the sub tank 100 is inserted.

FIG. 5 illustrates an attachment state where the ink cartridge 50 is attached to the sub tank 100. FIG. 6 illustrates a separated state where the ink cartridge 50 is separated from the sub tank 100. The attachment state will be illustrated in detail below.

The joint receiving portion 52 is provided with a plug member 62 capable of closing the communication port 61, and a spring 63 which urges the plug member 62 rearward. As illustrated in FIG. 6, in a state in which no external force is applied to the ink cartridge 50, the plug member 62 is at the position which closes the communication port 61. The spring 63 extends in the front-rear direction 8 between the plug member 62 and the front wall 59, and can be compressed in the front-rear direction 8. As illustrated in FIG. 5, when a forward external force greater than the elastic force of the spring 63 is applied to the plug member 62 by the joint 102, the plug member 62 moves forward and is separated from the communication port 61.

Housing Case 71

As illustrated in FIG. 4, the housing case 71 has a rectangular parallelepiped box shape having an open front end. The housing case 71 has an upper wall 72, a lower wall 73, a right wall 74, a left wall 75, a rear wall 76, and three partition walls 77. The upper wall 72, the lower wall 73, the right wall 74, the left wall 75, and the rear wall 76 define an internal space 78 that has an open front end. The three partition walls 77 are walls parallel to the right wall 74 and the left wall 75, and partition the internal space 78 into four spaces. Each of the four ink cartridges 50 can be mounted or attached in each of the partitioned four spaces.

Lock Lever 79

As illustrated in FIGS. 4, 5, and 6, the housing case 71 is provided with the lock lever 79 that holds the ink cartridge 50 in the internal space 78. The lock lever 79 is a plate-like member extending in the front-rear direction. The central portion of the lock lever 79 is provided on the upper wall 72 so as to be rotatable about an axis extending in the left-right direction 9. The lock lever 79 rotates between a lock position inclined rearward and an unlock position inclined forward. In a state where no external force is applied, the lock lever 79 is inclined rearward by its own weight and located at the lock position. At the lock position, the rear end portion of the lock lever 79 abuts against the front surface of the abutment portion 64 of the ink cartridge 50 in the internal space 78, and restricts the ink cartridge 50 from moving forward in the front-rear direction 8. When the front end portion of the lock lever 79 of the lock position is pressed downward by the user's finger, the lock lever 79 rotates from the lock position to the unlock position. At the unlock position, the rear end portion of the lock lever 79 is located above the front surface of the abutment portion 64. Since the lock lever 79 at the unlock position does not abut against the abutment portion 64 of the ink cartridge 50 which moves forward in the front-rear direction 8 (as an example of an attachment-detachment direction), the ink cartridge 50 can be detached from the housing case 71.

Sub Tank 100

FIGS. 4 to 11 illustrate a sub tank 100 (an example of a tank). The sub tank 100 is located below the lower wall 73 of the housing case 71.

Figure 7:
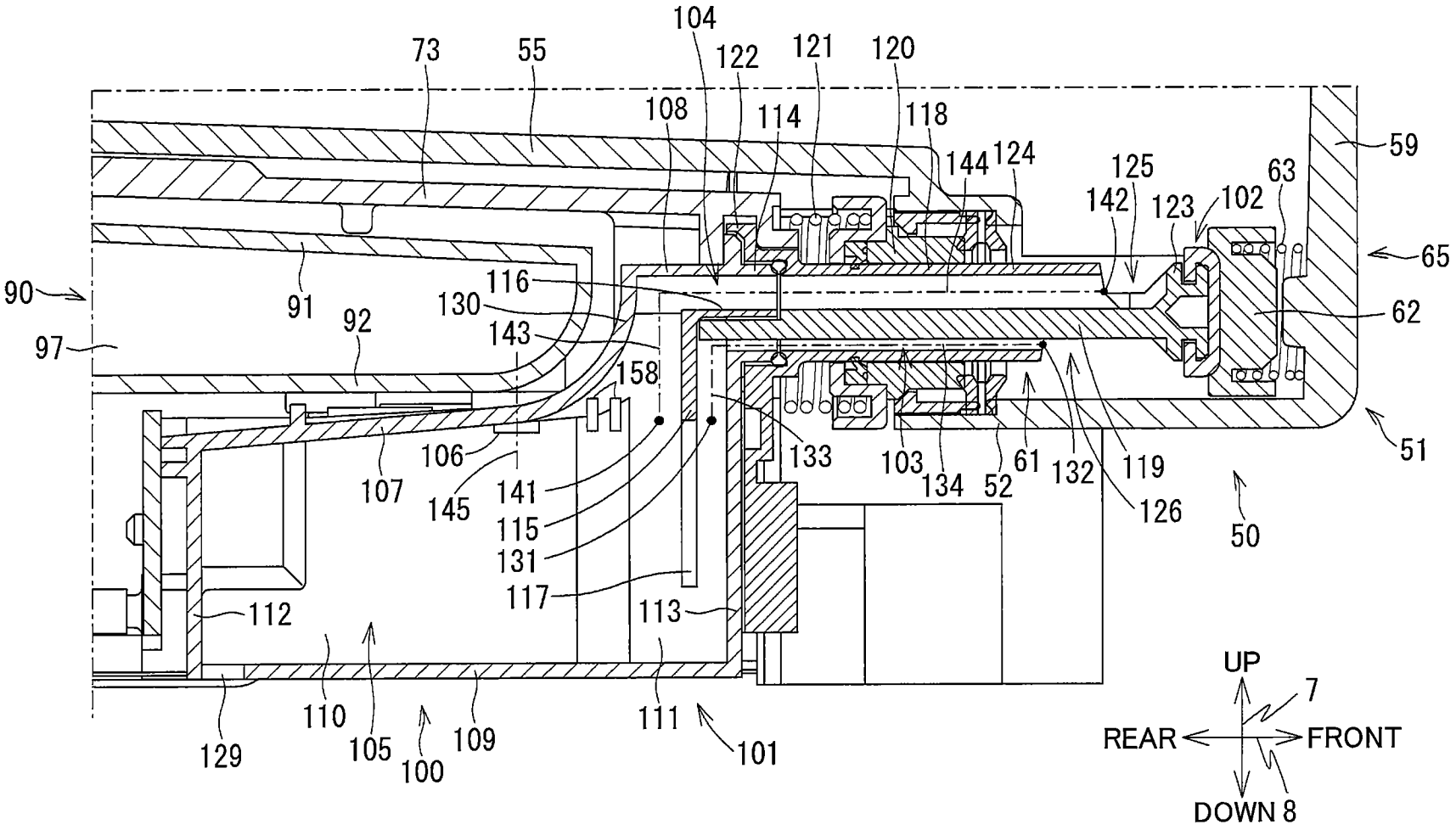
FIG. 7 is a cross-sectional view taken along the line V-V in FIG. 4 indicating a sub tank and a vicinity thereof.

As illustrated in FIG. 7, the sub tank 100 is provided with a tank main body 101 and the joint 102. A second storage chamber 105 which stores ink is formed inside the tank main body 101. The sub tank 100 is provided with a liquid flow passage 103 (example of a liquid passage) and a gas flow passage 104 (example of a gas passage) that communicate with the second storage chamber 105. The liquid flow passage 103 and the gas flow passage 104 are formed inside the tank main body 101 and inside the joint 102. Further, the sub tank 100 is provided with an atmospheric communication port 106 (see FIGS. 9, 10, and 12A) that causes the second storage chamber 105 to communicate with the outside. The atmospheric communication port 106 is an example of an air communication portion.

Liquid Flow Passage 103 and Gas Flow Passage 104

As illustrated in FIG. 7, the liquid flow passage 103 and the gas flow passage 104 are located in parallel.

The liquid flow passage 103 has a first opening 131, a second opening 132, a vertical portion 133 as an example of a first vertical portion, and a horizontal portion 134 as an example of a first extending portion. The first opening 131 is an opening which is formed on one end side (a rear end side) of the liquid flow passage 103 and communicates with the second storage chamber 105. The first opening 131 is opened along the up-down direction 7. The second opening 132 is an opening which is formed on the other end side (a front end side) opposite to the one end side of the liquid flow passage 103 and is opened to the outside or atmosphere. The second opening 132 is opened along the front-rear direction 8. The second opening 132 is located inside the first storage chamber 53 of the ink cartridge 50 in the attachment state of the ink cartridge 50. The vertical portion 133 is a portion extending upward from the first opening 131 in the liquid flow passage 103. The horizontal portion 134 is a portion extending rearward from the second opening 132 in the liquid flow passage 103. The upper end portion of the vertical portion 133 is connected to the rear end portion of the horizontal portion 134.

The gas flow passage 104 has a third opening 141, a fourth opening 142, a vertical portion 143 as an example of a second vertical portion, and a horizontal portion 144 as an example of a second extending portion. The third opening 141 is an opening which is formed on one end side (a rear end side) of the gas flow passage 104 and allows communication between the gas flow passage 104 and the second storage chamber 105. The third opening 141 is opened along the up-down direction 7. The fourth opening 142 is an opening which is formed on the other end side (a front end side) opposite to the one end side of the gas flow passage 104, and is opened to the outside or atmosphere. The fourth opening 142 is opened along the front-rear direction 8. The fourth opening 142 communicates with the first storage chamber 53 of the ink cartridge 50 in a state where the ink cartridge 50 is attached to the sub tank 100. The vertical portion 143 is a portion extending upward from the third opening 141 in the gas flow passage 104. The horizontal portion 144 is a portion extending rearward from the fourth opening 142 in the gas flow passage 104. The horizontal portion 144 is positioned above the horizontal portion 134. The upper end portion of the vertical portion 143 is connected to the rear end portion of the horizontal portion 144.

The second opening 132 of the horizontal portion 134 is at a position different from the fourth opening 142 of the horizontal portion 144 in the front-rear direction 8. Specifically, the second opening 132 is closer to the first opening 131 of the vertical portion 133 than the fourth opening 142 of the horizontal portion 144 is to the first opening 131 in the front-rear direction 8. In other words, the second opening 132 is positioned behind the fourth opening 142. A length L2 of the horizontal portion 144 in the front-rear direction 8 is longer than a length L1 of the horizontal portion 134 in the front-rear direction 8 ($L1<L2$).

In the attachment state where the first storage chamber 53 is in communication with both the second opening 132 and the fourth opening 142, the first storage chamber 53 has a portion positioned above the liquid flow passage 103 and the gas flow passage 104. In other words, in the attachment state where both the second opening 132 and the fourth opening 142 are in communication with the first storage chamber 53 of the cartridge 50, the liquid flow passage 103 and the gas flow passage 104 are positioned below the portion of the first storage chamber 53.

Tank Main Body 101

The tank main body 101 has an approximately rectangular parallelepiped outer wall. The tank main body 101 has a substantially T shape (see FIGS. 9 and 10) as viewed in the up-down direction 7, has a substantially rectangular shape (see FIG. 8) as viewed in the front-rear direction 8, and has an L shape as viewed in the left-right direction 9 (see FIGS. 4 to 7).

Figure 8:
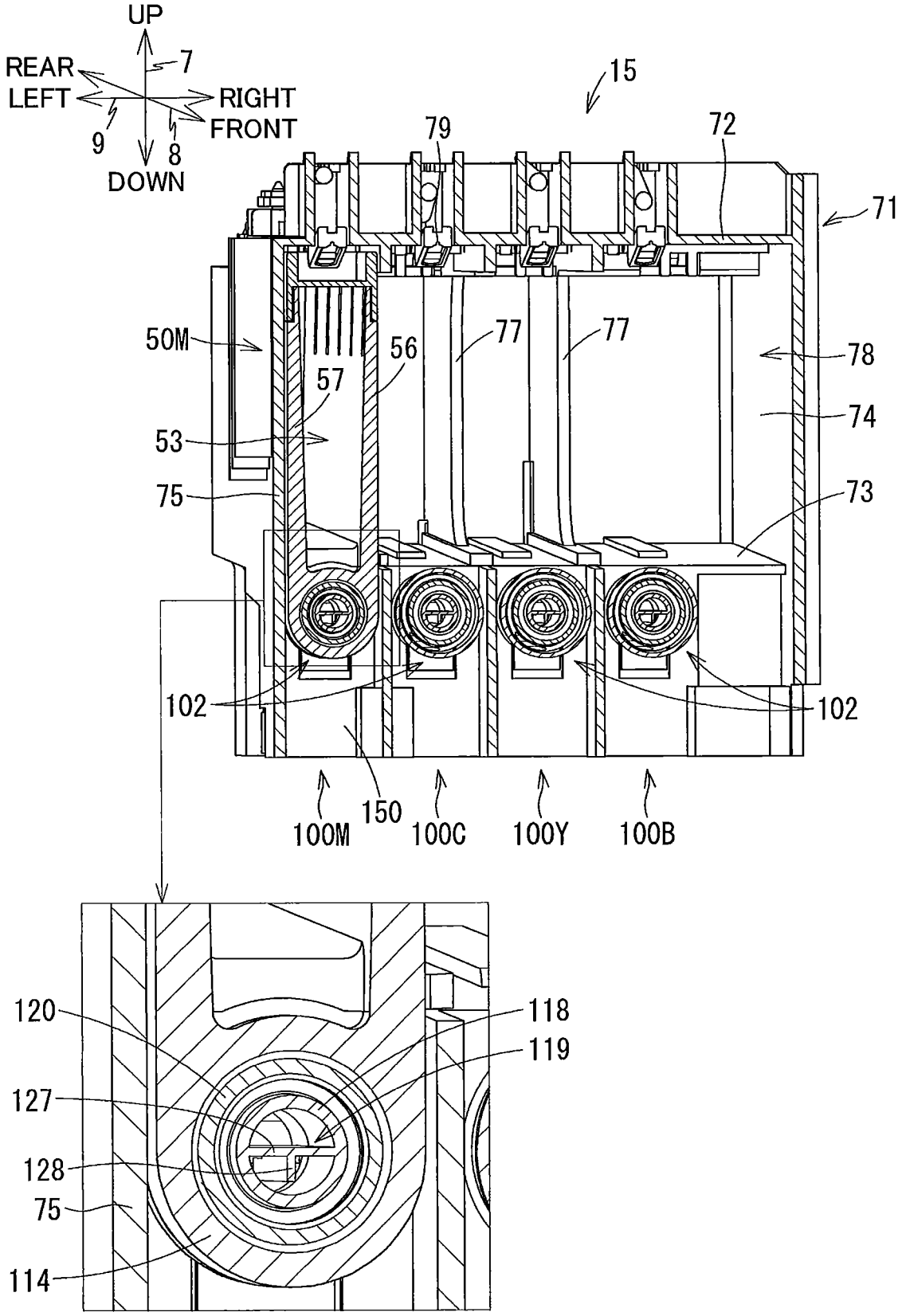
FIG. 8 is a cross-sectional view taken along a line VIII-VIII of FIG. 4.
Figure 9:
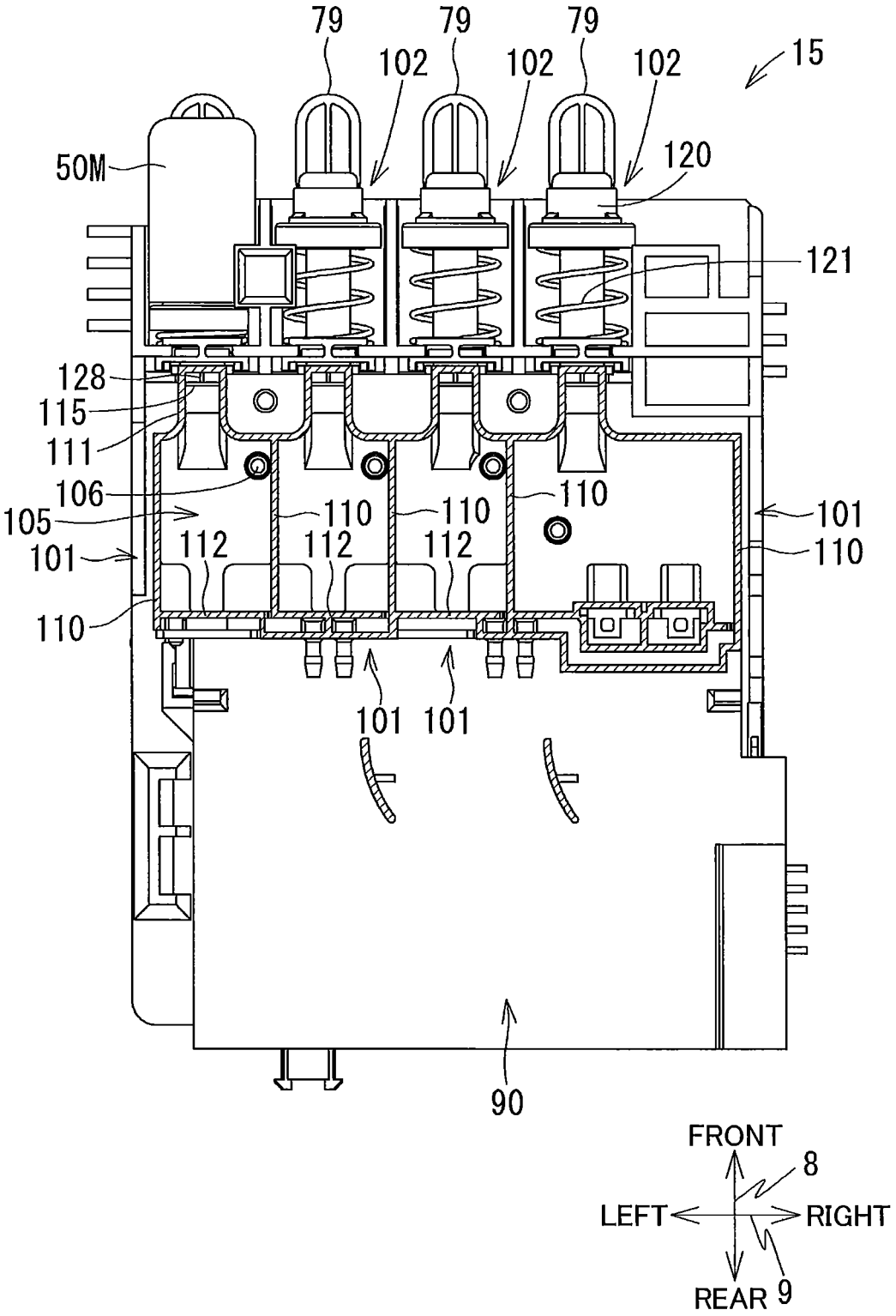
FIG. 9 is a cross-sectional view taken along a line IX-IX of FIG. 4.

As illustrated in FIGS. 4 to 11, the outer wall of the tank main body 101 has a rear upper wall 107, a bent upper wall 130, a front upper wall 108, a lower wall 109, two rear side walls 110, two front bent side walls 111, a rear wall 112, and a front wall 113. The rear upper wall 107 is a wall that extends forward, while being inclined upward from the rear end with respect to the horizontal plane. The bent upper wall 130 is a wall extending from the front end of the rear upper wall 107 and is bent upward from the front. The front upper wall 108 extends forward from the upper end of the bent upper wall 130 in parallel with the horizontal plane. The lower wall 109 extends in the front-rear direction 8 in parallel with the horizontal plane. The lower wall 109 has a T shape as viewed from the up-down direction 7. The rear side wall 110 connects the rear upper wall 107 and the lower wall 109 in the up-down direction 7. The rear side wall 110 has a substantially rectangular shape as viewed from the left-right direction 9. As illustrated in FIG. 9, the inside of the tank main body 101 is divided into four sections by three rear side walls 110. In other words, the rear side wall 110 is shared by the adjacent sections inside the tank main body 101. The front bent side wall 111 connects the bent upper wall 130, the front upper wall 108 and the lower wall 109 in the up-down direction 7. The front bent side wall 111 has a substantially rectangular shape as viewed from the left-right direction 9, and has an L shape in which the corner portion draws an arc shape as viewed in the up-down direction 7. The rear wall 112 extends upward from the rear end portion of the lower wall 109, and is connected to the two rear side walls 110 and the rear upper wall 107 located on the left and right sides. The front wall 113 extends upward from the front end portion of the lower wall 109, and is connected to the two front bent side walls 111 located on the left and right sides.

Figure 11:
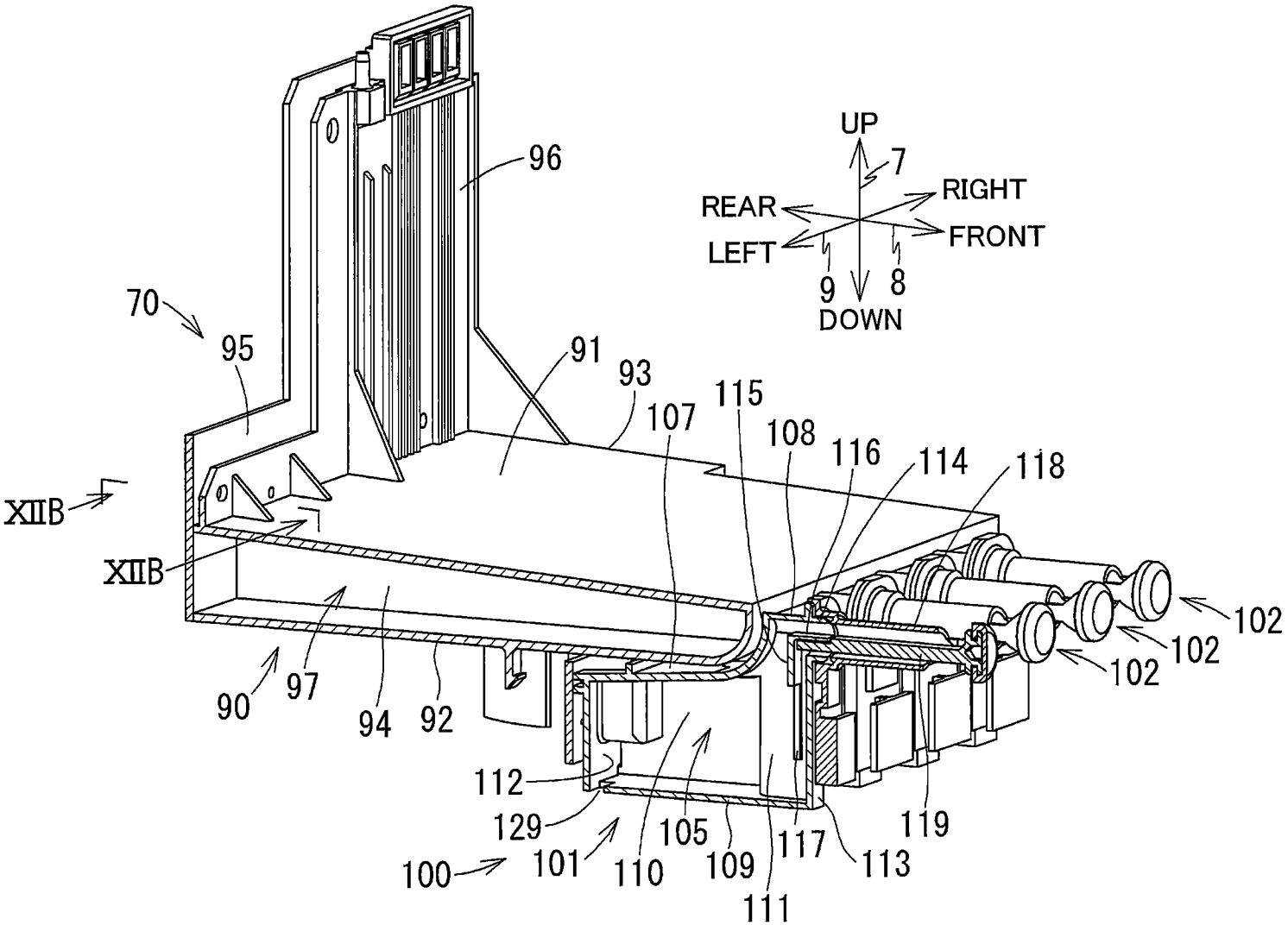
FIG. 11 is a perspective view of the sub tank and a buffer tank according to the embodiment as viewed from a left front side thereof.

As illustrated in FIGS. 7 and 11, a communication port 129 communicating with the second storage chamber 105 is formed on the lower wall 109. One end portion of the ink tube 32 is connected to the communication port 129, and the second storage chamber 105 and the recording head 39 are connected in communication with each other via the ink tube 32.

A cylindrical inner tubular portion 114 extending in the front-rear direction 8 is provided at the front end portion and the upper portion of the tank main body 101. The inside of the inner tubular portion 114 communicates with an opening formed by the front wall 113, the two front bent side walls 111 located on the left and right sides, and the front upper wall 108. A rear end portion of the joint 102 can be attached to the inner tubular portion 114. In the attachment state in which the joint 102 is attached to the inner tubular portion 114, the inside of the inner tubular portion 114 communicates with the inside of the joint 102.

Wide-Width Portion 150 and Narrow-Width Portion 151

Figure 10:
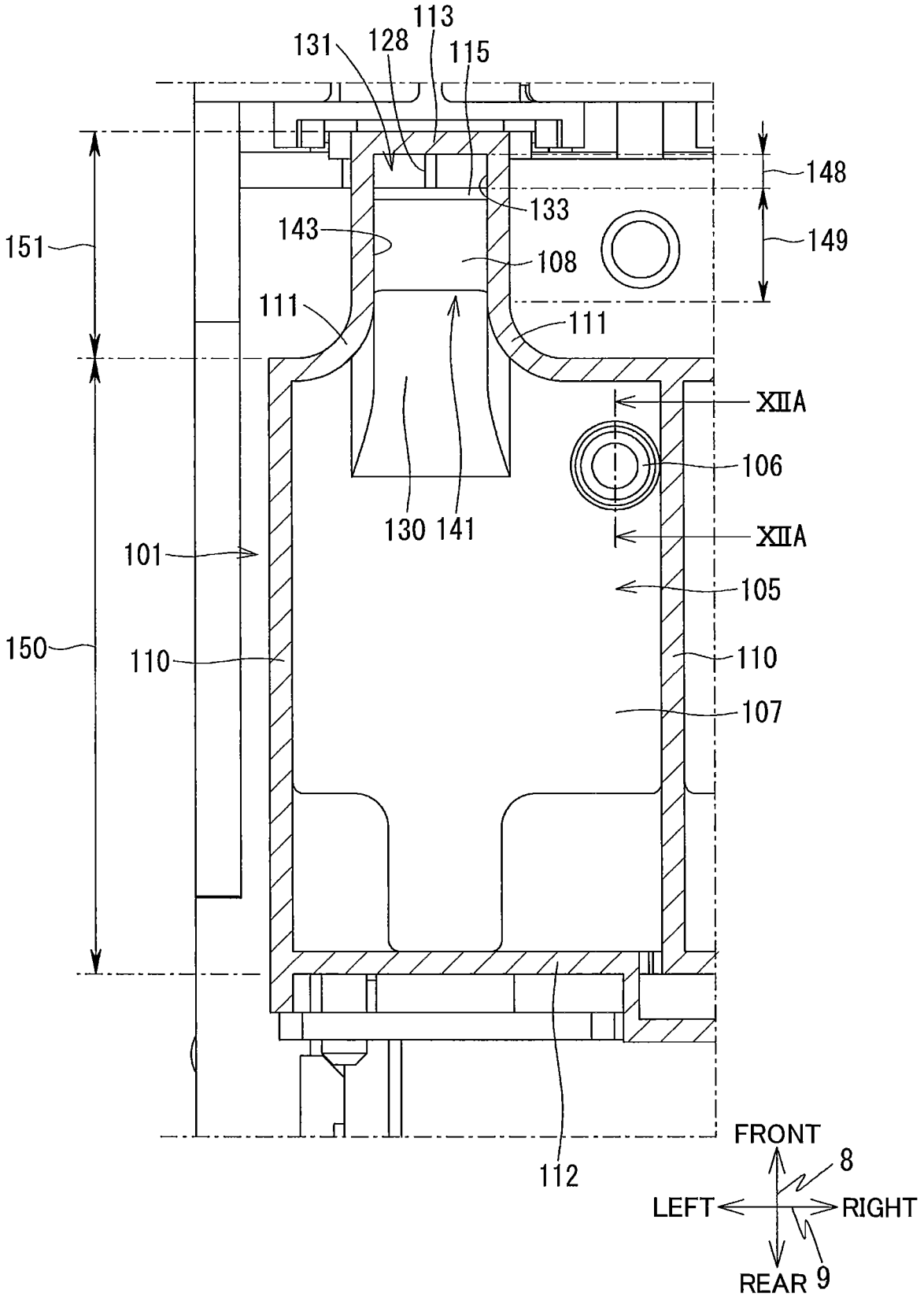
FIG. 10 is a cross-sectional view taken along the line IX-IX in FIG. 4 indicating the sub tank and a vicinity of the sub tank.

As illustrated in FIG. 10, the tank main body 101 has a wide-width portion 150 and a narrow-width portion 151 arranged in the front-rear direction 8. The wide-width portion 150 is a portion which is located at the rear portion of the tank main body 101 in the front-rear direction 8 and includes the two rear side walls 110 and the rear wall 112. The narrow-width portion 151 is a portion which is located at the front end portion of the tank main body 101 in the front-rear direction 8, and includes the two front bent side walls 111 and the front wall 113. The width of the narrow-width portion 151 in the left-right direction 9 is smaller than the width of the wide-width portion 150 in the left-right direction 9. The second storage chamber 105 is formed over the wide-width portion 150 and the narrow-width portion 151.

As illustrated in FIG. 8, the width of the wide-width portion 150 in the left-right direction 9 is substantially equal to the width of the ink cartridge 50 in the left-right direction 9. Therefore, the width of the narrow-width portion 151 in the left-right direction 9 is smaller than the width of the ink cartridge 50 in the left-right direction 9.

Vertical Wall 115 and Horizontal Wall 116

As illustrated in FIGS. 7 and 11, the tank main body 101 is provided with a vertical wall 115 and a horizontal wall 116 at the front part and the upper part of the tank main body 101.

The vertical wall 115 extends in the up-down direction 7 and located between the front wall 113 and the bent upper wall 130 in the front-rear direction 8. The vertical wall 115 connects the two front bent side walls 111 located on the left and right sides, and partitions the space defined by the front wall 113, the front upper wall 108, the bent upper wall 130, and the two front bent side walls 111 into the front and rear parts. The lower end position of the vertical wall 115 is the position of the first opening 131 of the liquid flow passage 103 in the up-down direction 7, and the position of the third opening 141 of the gas flow passage 104 in the up-down direction 7. The lower end level of the vertical wall 115 in the up-down direction 7 is equal to the lower end level of the front end of the rear upper wall 107. That is, the upper surface of the second storage chamber 105 is defined by a virtual plane passing through the lower end position of the vertical wall 115 and parallel to the horizontal plane, and the lower surface of the rear upper wall 107.

The horizontal wall 116 extends forward from the upper end of the vertical wall 115. The horizontal wall 116 extends to the inside of the inner tubular portion 114. The horizontal wall 116 connects the two front bent side walls 111 located on the left and right sides, and connects the inner surface of the inner tubular portion 114 in the left-right direction 9. The horizontal wall 116 partitions the space defined by the front upper wall 108 and the two front bent side walls 111, and the space defined by the inner tubular portion 114, into the upper and lower parts.

Ink Level Detection Plates 158

As illustrated in FIG. 7, the tank main body 101 is provided with a pair of ink level detection plates 158 therein. The pair of ink level detection plates 158 are conductive members. The pair of ink level detection plates 158 are provided at the same position with each other in the vertical direction 7. Electricity is conducted between the pair of ink level detection plates 158 when ink is present between the pair of ink level detection plates 158.

As illustrated in FIG. 10, the vertical portion 133 of the liquid flow passage 103 is defined by the vertical wall 115, the front wall 113, and the two front bent side walls 111. The shape of the cross-section of the vertical portion 133 orthogonal to the up-down direction 7 is rectangular. The vertical portion 133 of the liquid flow passage 103 continuously extends along the two front bent side walls 111 partitioning the second storage chamber 105, and the two front bent side walls 111 have surfaces defining the vertical portion 133. Therefore, the width of the vertical portion 133 in the left-right direction 9 is the same as the width of the second storage chamber 105 defined by the narrow-width portion 151 in the left-right direction 9.

As illustrated in FIG. 10, the vertical portion 143 of the gas flow passage 104 is defined by the bent upper wall 130, the vertical wall 115, and the two front bent side walls 111. The shape of the cross-section of the vertical portion 143 of the gas flow passage 104 orthogonal to the up-down direction 7 is rectangular. The vertical portion 143 continuously extends along the two front bent side walls 111 partitioning the second storage chamber 105, and the two front bent side walls 111 have surfaces defining the vertical portion 143. Therefore, the width of the vertical portion 143 of the gas flow passage 104 in the left-right direction 9 is the same as the width of the second storage chamber 105 in the left-right direction 9 defined by the narrow-width portion 151.

As illustrated in FIG. 10, a length 149 of the third opening 141 of the gas flow passage 104 in the front-rear direction 8 (an example of the horizontal direction) is longer than a length 148 of the first opening 131 of the liquid flow passage 103 in the front-rear direction 8 (an example of the horizontal direction). The length of the third opening 141 of the gas flow passage 104 in the left-right direction 9 is equal to the length of the first opening 131 of the liquid flow passage 103 in the left-right direction 9. Therefore, an opening area of the third opening 141 of the gas flow passage 104 is greater than the opening area of the first opening 131 of the liquid flow passage 103.

As illustrated in FIG. 7, in the vertical portion 143 of the gas flow passage 104, the opening area of the gas flow passage 104 is enlarged as it approaches the third opening 141 of the gas flow passage 104. In the vertical portion 133 of the liquid flow passage 103, the opening area of the liquid flow passage 103 is constant in the up-down direction 7.

As illustrated in FIG. 7, the horizontal portion 134 of the liquid flow passage 103 in the tank main body 101 is defined by the front upper wall 108, the horizontal wall 116, the two front bent side walls 111, and the inner tubular portion 114. The horizontal portion 144 of the gas flow passage 104 in the tank main body 101 is defined by the horizontal wall 116, the two front bent side walls 111, and the inner tubular portion 114.

First Rib 117

As illustrated in FIGS. 7 and 11, the tank main body 101 is provided with a first rib 117 continuous with the vertical wall 115. The first rib 117 protrudes from the front bent side wall 111 and extends downward from the vertical wall 115. The first rib 117 and the lower wall 109 are separated from each other. The first ribs 117 are provided on each of the two front bent side walls 111 located on the left and right sides, and the two first ribs 117 are located in one second storage chamber 105 so as to be separated in the left-right direction 9.

Joint 102

As illustrated in FIGS. 4 to 9 and 11, the joint 102 is provided with a joint main body 118, an inner wall 119, a plug member 120 (see FIGS. 6 and 7), and a spring 121 (see FIGS. 6 and 7).

Joint Main Body 118

As illustrated in FIG. 7, the joint main body 118 is provided with an outer tubular portion 122 located at the rear end portion, a distal end portion 123 located at the front end portion, and a main body portion 124 that connects the outer tubular portion 122 and the distal end portion 123. The outer tubular portion 122 has a cylindrical shape and extends in the front-rear direction 8. The outer tubular portion 122 is fitted into the inner tubular portion 114 of the tank main body 101. As a result, the joint main body 118 is fixed to the tank main body 101. The distal end portion 123 has a disc shape having an axis in the front-rear direction 8 as an axial center. The main body portion 124 has a cylindrical shape and extends in the front-rear direction 8. An upper opening portion 125 and a lower opening portion 126, which are each opened upward and downward, are formed at the front end portion of the main body portion 124.

Partition Wall 127 and Second Rib 128

As illustrated in FIGS. 7 and 8, the inner wall 119 is located inside the joint main body 118. The inner wall 119 extends rearward from the distal end portion 123 beyond the outer tubular portion 122. The inner wall 119 is provided with a partition wall 127 and a second rib 128. As illustrated in FIG. 8, the inner wall 119 has a T shape as viewed in the front-rear direction 8. The rear end surface of the partition wall 127 is in contact with the front end surface of the horizontal wall 116 in the tank main body 101. By the partition wall 127 and the horizontal wall 116, the internal space of the joining portion between the joint main body 118 and the tank main body 101 is partitioned into the liquid flow passage 103 and the gas flow passage 104.

The partition wall 127 is a wall that expands in the left-right direction 9 inside the joint main body 118. The partition wall 127 extends rearward from the distal end portion 123. The internal space of the joint main body 118 is partitioned into an upper part and a lower part by the partition wall 127.

The second rib 128 protrudes downward from the central portion of the partition wall 127 in the left-right direction 9. The second rib 128 extends rearward from the distal end portion 123. There is a gap between the second rib 128 and the inner surface of the joint main body 118.

The horizontal portion 134 of the liquid flow passage 103 in the joint 102 is defined by the inner surface of the joint main body 118 and the lower surface of the inner wall 119. The cross-section of the horizontal portion 134 of the liquid flow passage 103 in the joint 102 has a substantially semicircular shape. More precisely, in the cross-section of the horizontal portion 134, the semicircular upper portion is divided into right and left sides by the second rib 128, and the semicircular lower portion is connected without being divided into the right and left sides. The horizontal portion 144 of the gas flow passage 104 in the joint 102 is defined by the inner surface of the joint main body 118 and the upper surface of the inner wall 119. The cross-section of the horizontal portion 144 of the gas flow passage 104 in the joint 102 has a semicircular shape.

Plug Member 120 and Spring 121

The plug member 120 is a cylindrical member, and is located outside the main body portion 124 of the joint main body 118. The plug member 120 is movable in the front-rear direction 8 along the main body portion 124. The front end portion of the spring 121 is fixed to the rear end portion of the plug member 120, and the rear end portion thereof abuts against the outer tubular portion 122 of the joint main body 118. The spring 121 urges the plug member 120 forward. In the state in which no external force is applied, the plug member 120 is located at the front end portion of the joint main body 118, and closes the upper opening portion 125 and the lower opening portion 126. When a rearward external force greater than the elastic force of the spring 121 is applied to the plug member 120, the plug member 120 moves rearward, and the upper opening portion 125 and the lower opening portion 126 are opened. When the ink cartridge 50 is attached, the joint receiving portion 52 of the ink cartridge 50 abuts against the plug member 120. The plug member 120 abutting against the joint receiving portion 52 moves rearward by an external force applied when the ink cartridge 50 is attached.

Attachment State of Ink Cartridge 50

As illustrated in FIGS. 5 and 7, in the attachment state in which the ink cartridge 50 is attached to the sub tank 100, the joint main body 118 of the sub tank 100 is inserted into the joint receiving portion 52 of the ink cartridge 50 along the front-rear direction 8, and is further inserted into the communication port 61. In this attachment state, the second opening 132 of the liquid flow passage 103 of the sub tank 100 and the second opening 142 of the gas flow passage 104 enter the first storage chamber 53 of the ink cartridge 50. As illustrated in FIGS. 4 and 5, the ink cartridge 50 can be separated from and attached to the sub tank 100 in the front-rear direction 8.

Layout of Ink Cartridge 50 and Sub Tank 100

The layout of the ink cartridge 50 and the sub tank 100 will be described. The layout will be described on the assumption that the ink cartridge 50 is attached to the housing case 71, and the ink cartridge 50 and the sub tank 100 are in the use posture as illustrated in FIG. 5.

As illustrated in FIG. 5, the protruding portion 65 of the ink cartridge 50 is substantially at the same position as the joint 102 in the up-down direction 7, but the portion above the protruding portion 65 of the ink cartridge 50 is located above the joint 102. Therefore, most of the first storage chamber 53 of the ink cartridge 50 is located above the joint 102. Also, the upper part of the sub tank 100, that is, the upper part above the vicinity of the bent upper wall 130 is located at the substantially same position as the joint 102. However, the portion below the vicinity of the bent upper wall 130 of the sub tank 100 is located below the joint 102. Therefore, most of the second storage chamber 105 of the sub tank 100 is located below the joint 102 in the up-down direction 7.

A portion above the protruding portion 65 of the first storage chamber 53 is located above the horizontal portion 134 of the liquid flow passage 103 and above the horizontal portion 144 of the gas flow passage 104. The second storage chamber 105 is located below the horizontal portion 134 of the liquid flow passage 103 and [above] *below* the horizontal portion 144 of the gas flow passage 104. The lower portion of the first storage chamber 53 and the upper portion of the second storage chamber 105 are positioned on a line extending in the front-rear direction 8. The volume of the first storage chamber 53 is larger than the volume of the second storage chamber 105.

The horizontal portion 144 of the gas flow passage 104 is located above the horizontal portion 134 of the liquid flow passage 103.

As illustrated in FIG. 7, the first opening 131 of the liquid flow passage 103, the third opening 141 of the gas flow passage 104, and the atmospheric communication port 106 are disposed in this order from the communication port 61 of the first storage chamber 53 in the rearward direction or in the direction away from the first storage chamber 53. The second opening 132 of the liquid flow passage 103 and the fourth opening 142 of the gas flow passage 104 are disposed in this order in a direction away from the communication port 61 of the first storage chamber 53, that is, in the frontward direction or in the direction away from the first storage chamber 53. The position of the communication port 61 of the first storage chamber 53 in the up-down direction 7 corresponds to the position in the up-down direction 7 in which the first storage chamber 53 and the liquid flow passage 103 communicate with each other, and the direction facing rearward from the communication port 61 at the position in the up-down direction 7 is a direction away from the first storage chamber 53.

Atmospheric Communication Portion 70

As illustrated in FIGS. 5, 11, and 12, the atmospheric communication portion 70 is provided with the buffer tank 90, a communication flow passage 145, and an atmospheric communication path 147.

Buffer Tank 90

As illustrated in FIGS. 5 and 11, the buffer tank 90 is located below the housing case 71 and above the sub tank 100.

As illustrated in FIGS. 5 and 11, the buffer tank 90 is provided with an upper wall 91, a lower wall 92, two side walls 93, three partition walls 94, a rear wall 95, and a protruding wall 96. The upper wall 91 is a wall that spreads along a surface inclined with respect to a horizontal plane. The lower wall 92 is a wall that bends upward toward the front, while extending in the direction parallel to the horizontal plane from the rear. The front end portion of the lower wall 92 is connected to the front end portion of the upper wall 91. The two side walls 93 are walls that connect both end portions of the upper wall 91 and the lower wall 92 in the left-right direction 9 to each other in the up-down direction 7. The three partition walls 94 are walls disposed in parallel with the two side walls 93 in the left-right direction 9. The rear wall 95 is a wall which connects the rear end portions of the upper wall 91 and the lower wall 92 to each other. The protruding wall 96 is a wall extending upward from the rear end portion of the upper wall 91. A gap is formed in the front-rear direction 8 between the rear wall 95 and the protruding wall 96.

The lower wall 73 of the housing case 71 is located above the upper wall 91 of the buffer tank 90. The upper wall 91 of the buffer tank 90 supports the lower wall 73 of the housing case 71. Therefore, the upper wall 91 of the buffer tank 90 can support the ink cartridge 50 housed in the housing case 71 via the lower wall 73 of the housing case 71.

Buffer Chambers 97

The internal space defined by the upper wall 91, the lower wall 92, the two side walls 93, and the rear wall 95 is partitioned as four buffer chambers 97 by the three partition walls 94. The four buffer chambers 97 are communicatively connected to the four sub tanks 100, respectively. The four buffer chambers 97 are spaces which can store air sent to the first storage chamber 53 as the ink in the first storage chamber 53 is supplied to the second storage chamber 105 by the gas-liquid substitution.

As illustrated in FIG. 5, the buffer chamber 97 is located below the first storage chamber 53, and the second storage chamber 105 is located below the buffer chamber 97. A part of the first storage chamber 53 and a part of the buffer chamber 97 formed in the protruding portion 65 are positioned on a line extending in the front-rear direction 8. That is, the part of the first storage chamber 53 and the part of the buffer chamber 97 overlap each other in the front-rear direction 8. Further, a part of the protruding portion 65, a part of the joint 102, and a part of the buffer tank 90 are positioned on a line extending in the front-rear direction 8. That is, the part of the protruding portion 65, the part of the joint 102, and the part of the buffer tank 90 overlap one another in the front-rear direction 8. Further, a part of the first storage chamber 53 and a part of the buffer chamber 97 are positioned on a line extending in the up-down direction 7. That is, the part of the first storage chamber 53 and the part of the buffer chamber 97 overlap each other in the vertical direction 7.

Communication Flow Passage 145

Figure 12A:
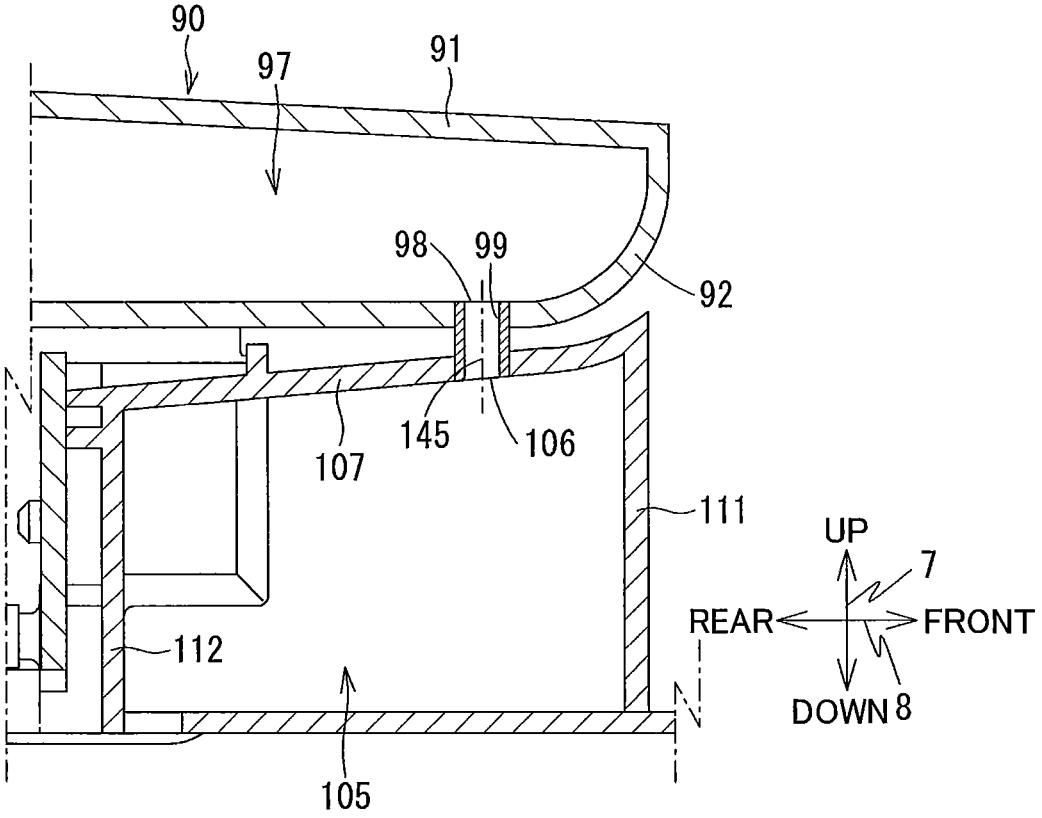
FIG. 12A is a cross-sectional view taken along a line XIIA-XIIA of FIG. 10.

As illustrated in FIG. 12A, the lower wall 92 of the buffer tank 90 has an opening portion 98 communicating with the buffer chamber 97. The ink supplying device 15 is provided with a connection pipe 99 that connects the atmospheric communication port 106 of the tank main body 101 and the opening portion 98 of the buffer tank 90. The connection pipe 99 has a cylindrical shape. A communication flow passage 145 that connects the second storage chamber 105 and the buffer chamber 97 is formed by the inner surface of the connection pipe 99. The communication flow passage 145 extends in the up-down direction 7.

Atmospheric Communication Passage 147

Figure 12B:
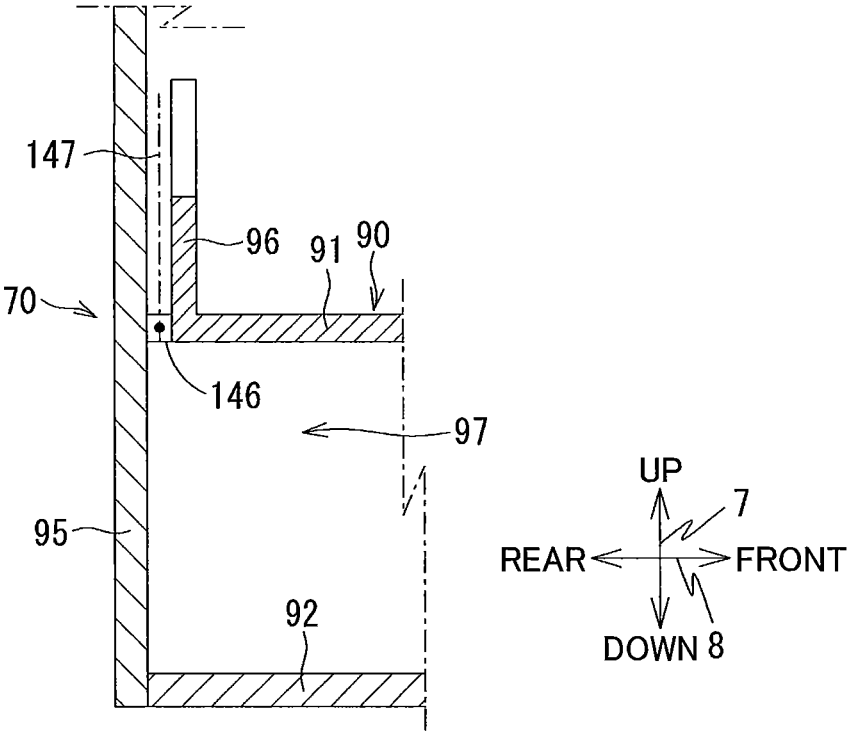
FIG. 12B is a cross-sectional view taken along a line XIIB-XIIB of FIG. 11.

As illustrated in FIG. 12B, an opening portion 146 is formed for each buffer chamber 97 at the rear end portion of the upper wall 91. The upper wall 91 has four opening portions 146 behind the protruding wall 96. The lower surface of the upper wall 91 is inclined upward in the direction (rearward) opposite to the opening portion 98 along the front-rear direction 8. The opening portion 146 is opened to the upper wall 91 at the position where the lower surface of the upper wall 91 is positioned the highest in the up-down direction 7. Here, the atmospheric communication passage 147 extending in the up-down direction 7 is formed by the front surface of the rear wall 95 and the rear surface of the protruding wall 96. The atmospheric communication passage 147 extends upward from the buffer chamber 97 via the opening portion 146, and communicates with the outside of the casing 14 of the multifunction machine 10.

Operation in Embodiment

First, the flow of ink and air at the time of initial introduction in which the ink cartridge 50 is initially attached to the empty sub tank 100 will be described.

In a state (a previous state) before the initial introduction illustrated in FIG. 6, the ink cartridge 50 is separated from the sub tank 100. In the previous state, the communication port 61 of the ink cartridge 50 is closed by the plug member 62. Therefore, the ink filled in the first storage chamber 53 does not leak to the outside. On the other hand, in the previous state, the upper opening portion 125 and the lower opening portion 126 (see FIG. 7) of the sub tank 100 are closed by the plug member 120. Therefore, the second opening 132 of the liquid flow passage 103 and the second opening 142 of the gas flow passage 104 communicating with the second storage chamber 105 are closed to the outside. The second storage chamber 105 has the atmospheric communication port 106 (see FIG. 7) and the communication port 129 (see FIG. 7) as parts communicating with the outside, in addition to the liquid flow passage 103 and the gas flow passage 104. The atmospheric communication port 106 communicates with the outside air of the multifunction machine 10 via the buffer chamber 97. The communication port 129 communicates with the recording head 39 via the ink tube 32. However, in a rest state of the recording head 39, the ink does not flow out of the communication port 129. Here, the second storage chamber 105 is not filled with ink, and the second storage chamber 105 is in an empty state.

As illustrated in FIGS. 5 and 7, when the ink cartridge 50 is attached to the sub tank 100, the plug member 62 which closes the communication port 61 retreats forward against the urging force of the spring 63, and the plug member 120, which closes the upper opening portion 125 and the lower opening portion 126, retreats rearward against the urging force of the spring 121. As a result, the first storage chamber 53 communicates with the second storage chamber 105 via the liquid flow passage 103 and the gas flow passage 104. Then, the ink in the first storage chamber 53 of the ink cartridge 50 naturally drops via the liquid flow passage 103, and is introduced into the second storage chamber 105 of the sub tank 100. Since the atmospheric communication port 106 is opened to the outside air, air having the same volume as the amount of ink introduced into the second storage chamber 105 is introduced into the first storage chamber 53 via the atmospheric communication port 106 and the gas flow passage 104. In this way, the first storage chamber 53 substitutes air for the ink in the first storage chamber 53 (gas-liquid substitution), the ink in the first storage chamber 53 is supplied to the second storage chamber 105.

As the gas-liquid substitution progresses, the liquid level of the ink in the second storage chamber 105 rises. When the liquid level of the ink rises to reach the lower end position of the vertical wall 115, the third opening 141 of the gas flow passage 104 is closed. Then, since the gas-liquid substitution cannot be performed, the supply of ink from the first storage chamber 53 to the second storage chamber 105 is stopped. In this way, ink is supplied at the time of initial introduction.

Next, the flow of ink and air when the printing operation is executed by the printer unit 11 in the attachment state of the ink cartridge 50 will be described.

When ink is ejected from the recording head 39 at the time of executing the recording operation, the ink in the second storage chamber 105 is sucked from the communication port 129 to the recording head 39. As the ink decreases, the liquid level of the ink in the second storage chamber 105 descends. Thus, the first opening 141 of the closed gas flow passage 104 is opened. When the first opening 141 of the gas flow passage 104 is opened, the gas-liquid substitution is executed as described above, and ink is supplied from the first storage chamber 53 to the second storage chamber 105. Ink is supplied from the first storage chamber 53 to the second storage chamber 105 so as to compensate for the consumption of ink in the recording head 39, and the height of the liquid level of the ink in the second storage chamber 105 is kept at the position of the first opening 141 of the gas flow passage 104.

After the ink in the first storage chamber 53 becomes empty, when ink is discharged from the recording head 39, the ink level of the second storage chamber 105 is lowered, as a result of which the third opening 141 of the gas flow passage 104, which has been closed by the ink, is opened. When the ink level is further lowered in the second storage chamber 105 and no ink becomes present between the ink level detection plates 158, electricity will not flow between the pair of the ink level detection plates 158. By detecting no electrical conduction between the pair of ink level detection plates 158, that is, by detecting that the ink is no longer present between the pair of ink level detection plates 158, the multifunction machine 10 determines that the ink level has dropped below a predetermined height. Thus, the multifunction machine 10 detects that the ink in the first storage chamber 53 of the ink cartridge 50 has become empty. In this case, by replacing the empty ink cartridge 50 with another ink cartridge 50 filled with ink, the multifunction machine 10 can continuously execute the recording operation. Electricity flows between the pair of ink level detection plates 158 when the space between the pair of ink level detection plates 158 is filled with the ink, whereas electricity does not flow between the pair of ink level detection plates 158 when the space between the pair of ink level detection plates 158 is filled with no ink. Thus, the multifunction machine 10 can detect whether the liquid level of the ink stored in the sub tank 100 is higher than the predetermined height.

Technical Effect of Embodiment

With the ink supplying device 15 according to this embodiment, since the first storage chamber 53 and the second storage chamber 105 are connected to each other via the gas flow passage 104 and the liquid flow passage 103, ink in the first storage chamber 53 can be supplied to the second storage chamber 105 by the gas-liquid substitution. Further, since the ink cartridge 50 is attachable to and detachable from the sub tank 100 in the front-rear direction 8, operability in replacing the ink cartridge 50 is good. Further, according to the structure of the above-described embodiment, the second opening 132 is disposed at a position different from the fourth opening 142 in the front-rear direction 8. This configuration can prevent gas (bubbles), which has flown into the first storage chamber 53 through the fourth opening 142, from staying or floating in the vicinity of the second opening 132, and therefore restricts the gas from entering the liquid flow passage 103 through the second opening 132.

Further, since the horizontal portion 144 of the gas flow passage 104 is positioned above the horizontal portion 134 of the liquid flow passage 103, due to the hydraulic head difference between the liquid flow passage 103 and the gas flow passage 104, the ink in the ink cartridge 50 more easily flows to the liquid flow passage 103 than the gas flow passage 104. A reverse flow which causes ink to flow along the gas flow passage 104 does not occur. Thus, the ink flows along the liquid flow passage 103 and the gas flows along the gas flow passage 104. Further, since the fourth opening 142 is at a position different from the second opening 132 in the front-rear direction 8, air, which has flown into the first storage chamber 53 through the fourth opening 142, is restricted from entering the liquid flow passage 103 through the second opening 132. Therefore, the ink is stably supplied from the ink cartridge 50 to the sub tank 100 in accordance with the decrease of the ink in the sub tank 100.

Further, since the second opening 132 is closer to the first opening 131 than the fourth opening 142 is to the first opening 131 in the front-rear direction 8, a flow path resistance of the liquid flow passage 103 is low. So, smooth gas-liquid substitution can be easily realized.

Since the length L1 of the horizontal portion 134 in the front-rear direction 8 is shorter than the length L2 of the horizontal portion 144 (L1<L2) in the front-rear direction 8, even if the cross-sectional area of the horizontal portion 134 is substantially the same as that of the horizontal portion 144, the flow resistance of the horizontal portion 134 is a smaller than that of the horizontal portion 144. Thus, when the ink cartridge 50 is connected to the sub tank 100, ink stored in the first storage chamber 53 smoothly flows into the second storage chamber 105 through the horizontal portion 134.

Further, since the liquid flow passage 103 is opened with respect to the second storage chamber 105 at the first opening 131 below the second opening 132, and the gas flow passage 104 is opened at the third opening 141 below the fourth opening 142, the ink in the second storage chamber 105 is hard to flow backward into the liquid flow passage 103 and the gas flow passage 104.

Modifications

Figure 13:
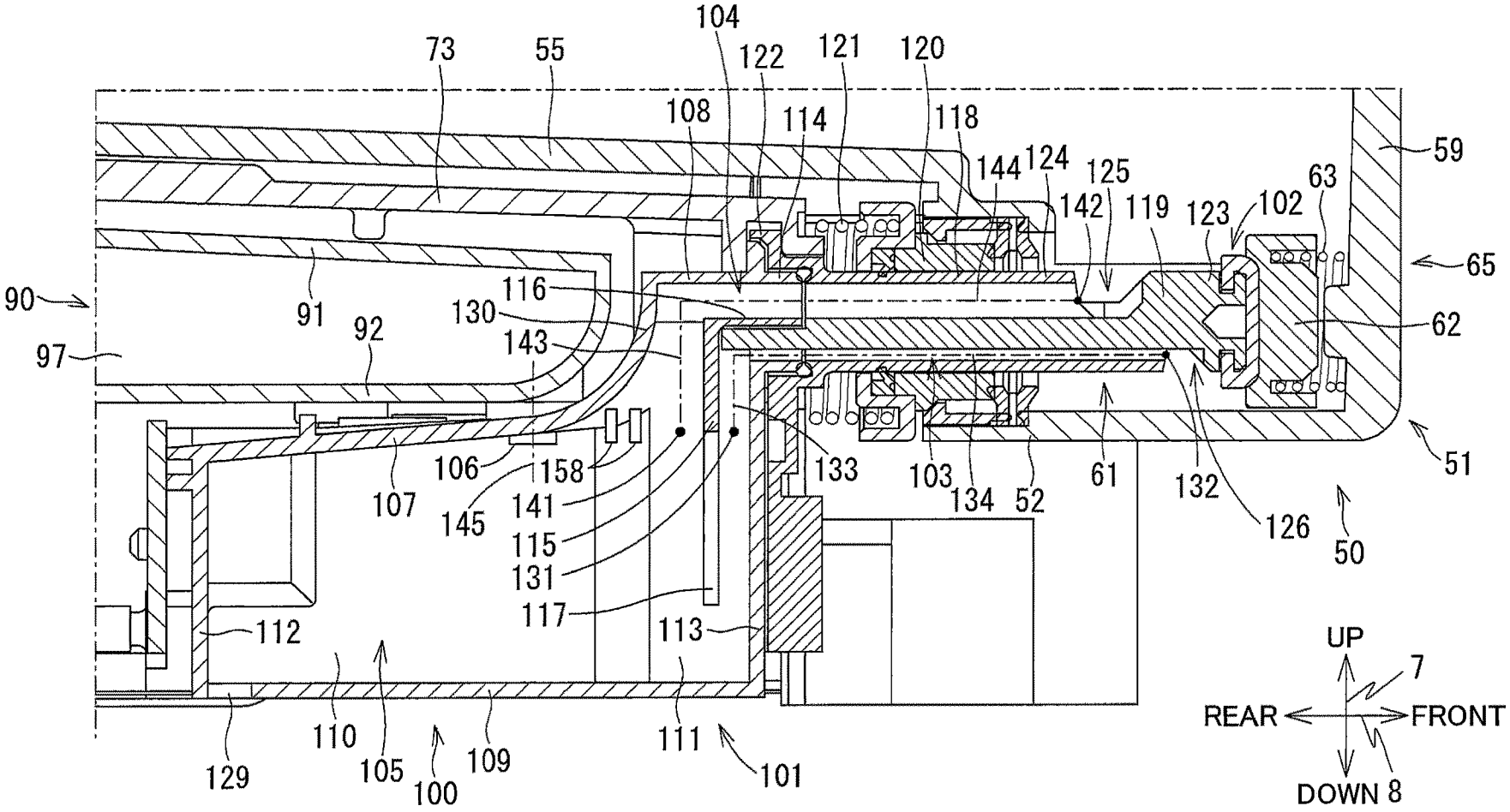
FIG. 13 is a cross-sectional view according to a modification and corresponds to FIG. 7.

In the above-described embodiment, the second opening 132 is closer to the first opening 131 than the fourth opening 142 is to the first opening 131 in the front-rear direction 8. Instead of this configuration, as illustrated in FIG. 13, the fourth opening 142 may be closer to the first opening 131 than the second opening 132 is to the first opening 131 in the front-rear direction 8. In other words, the second opening 132 may be arranged at a position forward of the fourth opening 142. In this case, the length L2 of the horizontal portion 144 in the front-rear direction 8 is shorter than the length L1 of the horizontal portion 134 in the front-rear direction 8 (L1>L2). According to this configuration, when the ink cartridge 50 is attached to the sub tank 100, the second opening 132 is brought into communication with the first storage chamber 53 earlier than the fourth opening 142 is brought into communication with the first storage chamber 53. This configuration ensures that even if the pressure of the gas in the first storage chamber 53 of the ink cartridge 50 is slightly higher than the atmospheric pressure, ink stored in the first storage chamber 53 properly flows into the second storage chamber 105 through the liquid flow passage 103 when the ink cartridge 50 is attached to the sub tank 100. Ink is prevented from entering the gas flow passage 104.

In the ink supplying device 15 according to the aforementioned embodiment, the liquid flow passage 103 has the vertical portion 133 and the horizontal portion 134, and the gas flow passage 104 has the vertical portion 143 and the horizontal portion 144. However, the liquid flow passage 103 may have only the horizontal portion 134, and may not have the vertical portion 133. Similarly, the gas flow passage 104 may have only the horizontal portion 144, and may not have the vertical portion 143.

In the ink supplying device 15 according to the aforementioned embodiment, the ink cartridge 50 is attached to the sub tank 100 in the front-rear direction 8 which is parallel with the horizontal direction. However, the attachment-detachment direction, in which the ink cartridge 50 is attached to and detached from the sub tank 100, is not limited to the front-rear direction 8. The attachment-detachment direction may be left-right direction 9 which is also parallel with the horizontal direction. The attachment-detachment direction may be inclined with respect to the horizontal direction as far as the ink cartridge 50 can be easily attached to the sub tank 100. For example, the attachment-detachment direction may be inclined with respect to the horizontal direction by an angle of less than 45 degrees (preferably, less than 30 degrees). In this case, both of the horizontal portion 134 and the horizontal portion 144 extend in a direction that is inclined with respect to the horizontal direction by an inclination angle which is the same as the angle, by which the attachment-detachment direction is inclined with respect to the horizontal direction.

In the ink supplying device 15 according to the aforementioned embodiment, both the horizontal portion 134 of the liquid flow passage 103 and the horizontal portion 144 of the gas flow passage 104 are formed in the same joint 102. However, the ink supplying device 15 may be provided with the two joints, the horizontal portion 134 of the liquid flow passage 103 may be formed in one of the joints, and the horizontal portion 144 of the gas flow passage 104 may be formed in the other joint. Further, a relative positional relation in the up-down direction between the horizontal portion 134 of the liquid flow passage 103 and the horizontal portion 144 of the gas flow passage 104 may be either above or below.

Further, in the aforementioned embodiment, the first opening 131 of the liquid flow passage 103, the third opening 141 of the gas flow passage 104, and the atmospheric communication port 106 are sequentially located in a direction away from the communication port 61 of the first storage chamber 53. However, the positional relation between the first opening 131, the third opening 141, and the atmospheric communication port 106 is not limited. One of the first opening 131, the third opening 141, and the atmospheric communication port 106 may be located in the front part or the rear part, or may be arranged in the left-right direction 9.

Further, in the aforementioned embodiment, the vertical portion 143 of the gas flow passage 104 continuously extends along the two front bent side walls 111 that partition the second storage chamber 105, and the two front bent side walls 111 have surfaces defining the vertical portion 143. However, the vertical portion 143 of the gas flow passage 104 may include the walls which are not continuously extending along the two front bent side walls 111 partitioning the second storage chamber 105, for example, walls separated by a step.

In the aforementioned embodiment, the lower portion of the first storage chamber 53 and the upper portion of the sub tank 100 are positioned on a line extending in the horizontal direction, but may not be located on the same line in the horizontal direction, and may be located on parallel different lines in the horizontal direction, respectively.

In the aforementioned embodiment, the volume of the first storage chamber 53 is greater than the volume of the second storage chamber 105. However, these volumes may be approximately the same, or the volume of the second storage chamber 105 may be greater than the volume of the first storage chamber 53.

Further, in the aforementioned embodiment, the inner tubular portion 114 and the joint main body 118 are formed as separate members. However, they may be integrally molded, and the inner wall 119 constituting the joint 102 may also be molded integrally with the inner tubular portion 114 and the joint main body 118. In the aforementioned embodiment, the horizontal wall 116 of the tank main body 101 and the inner wall 119 of the joint 102 are formed as separate members, but they may be integrally molded. In the aforementioned embodiment, the tank main body 101 and the joint 102 are formed as separate members, but they may be integrally molded.

The wide-width portion 150 and the narrow-width portion 151 are formed in the tank main body 101 in the aforementioned embodiment. However, for example, the narrow-width portion 151 may not be formed, and the tank main body 101 may be configured to have a constant width.

While the description has been made in detail with reference to the embodiments thereof, it would be apparent to those skilled in the art that many modifications and variations may be made therein without departing from the spirit of the disclosure.

What is claimed is:

1. A liquid supplying device comprising:

a tank; and a cartridge configured to be attached to and detached from the tank in an attachment-detachment direction crossing a vertical direction, the cartridge comprising a first storage chamber configured to store liquid;

the tank comprising:

a second storage chamber configured to store the liquid;

a liquid passage in communication with the second storage chamber, the liquid passage having a first end connected to the second storage chamber and formed with a first opening, a second end opposite to the first end and formed with a second opening open to an atmosphere, and a first extending portion extending from the second opening in the attachment-detachment direction;

a gas passage in communication with the second storage chamber, the gas passage having a third end connected to the second storage chamber and formed with a third opening, a fourth end opposite to the third end and formed with a fourth opening open to the atmosphere, and a second extending portion extending from the fourth opening in the attachment-detachment direction; and an air communication portion having an air communication opening allowing the second storage chamber to communicate with the atmosphere;

wherein the second opening is at a position different from the fourth opening in the attachment-detachment direction, and wherein, in an attachment state where the first storage chamber is in communication with both the second opening and the fourth opening, the first storage chamber has a portion positioned above the liquid passage and the gas passage.

2. The liquid supplying device according to claim 1, wherein the second extending portion is positioned above the first extending portion.

3. The liquid supplying device according to claim 1, wherein the second opening is closer to the first opening than the fourth opening is to the first opening in the attachment-detachment direction.

4. The liquid supplying device according to claim 1, wherein a length of the second extending portion in the attachment-detachment direction is longer than a length of the first extending portion in the attachment-detachment direction.

5. The liquid supplying device according to claim 1, wherein the second opening is farther from the first opening than the fourth opening is from the first opening in the attachment-detachment direction[, and the second opening is brought into communication with the first storage chamber earlier than the fourth opening is brought into communication with the first storage chamber when the cartridge is attached to the tank].

6. The liquid supplying device according to claim 1, wherein the liquid passage further has a first vertical portion extending upward from the first opening in a cross direction crossing the attachment-detachment direction; and wherein the gas passage further has a second vertical portion extending upward from the third opening in the cross direction.

7. The liquid supplying device according to claim 1, wherein the cartridge further has a communicating opening in communication with the first storage chamber and open in the attachment-detachment direction; and wherein the tank has a tubular joint including the first extending portion and the second extending portion, the tubular joint configured to be connected to the communicating opening of the cartridge in the attachment state.

8. The liquid supplying device according to claim 1, wherein a capacity of the first storage chamber is greater than a capacity of the second storage chamber.

9. The liquid supplying device according to claim 1, wherein the attachment-detachment direction is parallel with a horizontal direction.

10. An image recording apparatus comprising:

a liquid supplying device comprising:

a tank; and a cartridge configured to be attached to and detached from the tank in an attachment-detachment direction crossing a vertical direction, the cartridge comprising a first storage chamber configured to store liquid;

the tank comprising:

a second storage chamber configured to store the liquid;

a liquid passage in communication with the second storage chamber, the liquid passage having a first end connected to the second storage chamber and formed with a first opening, a second end opposite to the first end and formed with a second opening open to an atmosphere, and a first extending portion extending from the second opening in the attachment-detachment direction;

a gas passage in communication with the second storage chamber, the gas passage having a third end connected to the second storage chamber and formed with a third opening, a fourth end opposite to the third end and formed with a fourth opening open to the atmosphere, and a second extending portion extending from the fourth opening in the attachment-detachment direction; and an air communication portion having an air communication opening allowing the second storage chamber to communicate with the atmosphere;

wherein, the second opening is positioned *at a location* different from *a location of* the fourth opening in the attachment-detachment direction, and wherein, in an attachment state where the first storage chamber is in communication with both the second opening and the fourth opening, the first storage chamber has a portion positioned above the liquid passage and the gas passage.

11. The image recording apparatus according to claim 10, wherein the second extending portion is positioned above the first extending portion.

12. The image recording apparatus according to claim 10, wherein the second opening is closer to the first opening than the fourth opening is to the first opening in the attachment-detachment direction.

13. The image recording apparatus according to claim 10, wherein a length of the second extending portion in the attachment-detachment direction is longer than a length of the first extending portion in the attachment-detachment direction.

14. The image recording apparatus according to claim 10, wherein the second opening is farther from the first opening than the fourth opening is from the first opening in the attachment-detachment direction[, and the second opening is brought into communication with the first storage chamber earlier than the fourth opening is brought into communication with the first storage chamber when the cartridge is attached to the tank].

15. A liquid supplying device comprising a tank, to which a cartridge is detachably attached in an attachment-detachment direction crossing a vertical direction, the cartridge comprising a first storage chamber configured to store liquid;

the tank comprising:

a second storage chamber configured to store the liquid;

a liquid passage in communication with the second storage chamber, the liquid passage having a first end connected to the second storage chamber and formed with a first opening, a second end opposite to the first end and formed with a second opening open to an atmosphere, and a first extending portion extending from the second opening in the attachment-detachment direction;

a gas passage in communication with the second storage chamber, the gas passage having a third end connected to the second storage chamber and formed with a third opening, a fourth end opposite to the third end and formed with a fourth opening open to the atmosphere, and a second extending portion extending from the fourth opening in the attachment-detachment direction; and an air communication portion having an air communication opening allowing the second storage chamber to communicate with the atmosphere;

wherein the second opening is at a position different from the fourth opening in the attachment-detachment direction, and wherein, in an attachment state where both the second opening and the fourth opening of the tank are in communication with the first storage chamber of the cartridge, the liquid passage and the gas passage are positioned below a portion of the first storage chamber.

16. The liquid supplying device according to claim 15, wherein the second extending portion is positioned above the first extending portion.

17. The liquid supplying device according to claim 15, wherein the second opening is closer to the first opening than the fourth opening is to the first opening in the attachment-detachment direction.

18. The liquid supplying device according to claim 15, wherein a length of the second extending portion in the attachment-detachment direction is longer than a length of the first extending portion in the attachment-detachment direction.

19. The liquid supplying device according to claim 15, wherein the second opening is farther from the first opening than the fourth opening is from the first opening in the attachment-detachment direction[, and the second opening is brought into communication with the first storage chamber earlier than the fourth opening is brought into communication with the first storage chamber when the cartridge is attached to the tank].

*20. A tank configured to detachably attach to a cartridge having a first storage chamber;*

*the tank comprising:*

*a second storage chamber;*

*a liquid passage in communication with the second storage chamber, the liquid passage having a first end connected to the second storage chamber and formed with a first opening a second end opposite to the first end and formed with a second opening open to an atmosphere, and a first extending portion extending from the second opening*

*a gas passage in communication with the second storage chamber, the gas passage having a third end connected to the second storage chamber and formed with a third opening a fourth end opposite to the third end and formed with a fourth opening open to the atmosphere, and a second extending portion extending from the fourth opening and*

*an air communication portion having an air communication opening allowing the second storage chamber to communicate with the atmosphere;*

*wherein the second opening is at a position different from the fourth opening in an attachment-detachment direction of the cartridge, the attachment-detachment direction crossing a vertical direction, and*

*wherein, in an attachment state where both the second opening and the fourth opening of the tank are in communication with the first storage chamber of the cartridge, the liquid passage and the gas passage are positioned below a portion of the first storage chamber.*

*21. The tank according to claim 20, wherein the second extending portion is positioned above the first extending portion.*

*22. The tank according to claim 20, wherein the second opening is closer to the first opening than the fourth opening is to the first opening in the attachment-detachment direction.*

*23. The tank according to claim 20, wherein a length of the second extending portion in the attachment-detachment direction is longer than a length of the first extending portion in the attachment-detachment direction.*

*24. The tank according to claim 20, wherein the second opening is farther from the first opening than the fourth opening is from the first opening in the attachment-detachment direction.*

*25. The tank according to claim 20, wherein the liquid passage further has a first vertical portion extending upward from the first opening in a cross direction crossing the attachment-detachment direction; and*

*wherein the gas passage further has a second vertical portion extending upward from the third opening in the cross direction.*

*26. The tank according to claim 20, wherein the first extending portion extends from the second opening in a horizontal direction, and the second extending portion extends from the fourth opening in the horizontal direction.*

*27. The tank according to claim 20, further comprising a tubular joint including the first extending portion and the second extending portion.*

*28. A tank comprising:*

*a storage chamber configured to store liquid;*

*a liquid passage in communication with the storage chamber, the liquid passage having a first end connected to the storage chamber and formed with a first opening a second end opposite to the first end and formed with a second opening open to an atmosphere, and a first extending portion extending from the second opening in a prescribed direction crossing a vertical direction;*

*a gas passage in communication with the storage chamber, the gas passage having a third end connected to the storage chamber and formed with a third opening a fourth end opposite to the third end and formed with a fourth opening open to the atmosphere, and a second extending portion extending from the fourth opening in the prescribed direction; and*

*an air communication portion having an air communication opening allowing the storage chamber to communicate with the atmosphere;*

*wherein the second opening is at a position different from the fourth opening in the prescribed direction, and*

*wherein the storage chamber is positioned below both of the first extending portion and the second extending portion.*

*29. The tank according to claim 28, wherein the second extending portion is positioned above the first extending portion.*

*30. The tank according to claim 28, wherein the second opening is closer to the first opening than the fourth opening is to the first opening in the prescribed direction.*

*31. The tank according to claim 28, wherein a length of the second extending portion in the prescribed direction is longer than a length of the first extending portion in the prescribed direction.*

*32. The tank according to claim 28, wherein the second opening is farther from the first opening than the fourth opening is from the first opening in the prescribed direction.*

*33. The tank according to claim 28, wherein the liquid passage further has a first vertical portion extending upward from the first opening in a cross direction crossing the prescribed direction; and*

*wherein the gas passage further has a second vertical portion extending upward from the third opening in the cross direction.*

*34. The tank according to claim 28, wherein the prescribed direction is parallel with a horizontal direction.*

*35. The tank according to claim 28, further comprising a tubular joint including the first extending portion and the second extending portion.*

* * * * *